United States Patent
Kim et al.

(10) Patent No.: US 11,784,395 B2
(45) Date of Patent: Oct. 10, 2023

(54) GRIP DETECTION METHOD AND ELECTRONIC DEVICE SUPPORTING SAME

(71) Applicant: Samsung Electronics Co., Ltd., Suwon-si (KR)

(72) Inventors: Hyunsoo Kim, Suwon-si (KR); Gaeun Lee, Suwon-si (KR); Dongil Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 17/089,952

(22) Filed: Nov. 5, 2020

(65) Prior Publication Data

US 2021/0135338 A1 May 6, 2021

(30) Foreign Application Priority Data

Nov. 5, 2019 (KR) .................. 10-2019-0140373

(51) Int. Cl.
*H01Q 1/24* (2006.01)
*H04B 5/00* (2006.01)
*H04W 4/80* (2018.01)

(52) U.S. Cl.
CPC ............. *H01Q 1/245* (2013.01); *H01Q 1/243* (2013.01); *H04B 5/0037* (2013.01); *H04B 5/0081* (2013.01); *H04W 4/80* (2018.02)

(58) Field of Classification Search
CPC ................................ H01Q 1/243; H01Q 1/245
See application file for complete search history.

(56) References Cited

U.S. PATENT DOCUMENTS

| 9,124,273 B2 * | 9/2015 | Unterreitmayer .... G01D 5/2405 |
| 9,935,361 B2 * | 4/2018 | Chang .................... H01Q 1/243 |
| 10,050,332 B2 * | 8/2018 | Kim ........................ H01Q 1/50 |

(Continued)

FOREIGN PATENT DOCUMENTS

| KR | 10-2017-0079461 A | 7/2017 |
| KR | 10-2017-0112494 A | 10/2017 |

(Continued)

OTHER PUBLICATIONS

International Search Report dated Mar. 5, 2021, issued in International Application No. PCT/KR2020/015419.

*Primary Examiner* — Ab Salam Alkassim, Jr.
(74) *Attorney, Agent, or Firm* — Jefferson IP Law, LLP

(57) ABSTRACT

An electronic device is provided. The electronic device includes a housing including a front surface, a rear surface, and a side surface which at least partially surrounds a space between the front surface and the rear surface, a first antenna disposed in the space, a second antenna disposed substantially in parallel with the rear surface in the space and formed in a coil shape, a conductor spaced a predetermined distance apart from a partial region of the second antenna substantially in parallel therewith and at least partially overlapping the partial region, a sensor electrically connected to the conductor, a communication circuit electrically connected to the first antenna, and a processor electrically connected to the sensor and the communication circuit, and the processor is configured to acquire a capacitance value related to the conductor, and reduce an intensity of a signal outputted through the first antenna according to the acquired capacitance value.

8 Claims, 14 Drawing Sheets

(56) References Cited

U.S. PATENT DOCUMENTS

| | | | | |
|---|---|---|---|---|
| 10,474,282 B2* | 11/2019 | Park | .................... | G06F 3/0416 |
| 10,741,905 B2* | 8/2020 | Kim | .................... | H02J 50/005 |
| 11,177,557 B2* | 11/2021 | Lee | .................... | H01Q 21/08 |
| 2011/0012794 A1* | 1/2011 | Schlub | .................... | H01Q 5/378 |
| | | | | 343/702 |
| 2012/0105295 A1* | 5/2012 | Lin | .................... | H01Q 9/42 |
| | | | | 333/81 R |
| 2013/0300618 A1* | 11/2013 | Yarga | .................... | H01Q 1/243 |
| | | | | 343/720 |
| 2014/0361979 A1* | 12/2014 | Woo | .................... | H04B 1/0475 |
| | | | | 343/702 |
| 2015/0053773 A1* | 2/2015 | Hsu | .................... | H01Q 7/00 |
| | | | | 235/492 |
| 2015/0099558 A1* | 4/2015 | Zehr | .................... | H01Q 21/28 |
| | | | | 455/522 |
| 2016/0254587 A1* | 9/2016 | Jung | .................... | H02J 50/12 |
| | | | | 343/702 |
| 2016/0352015 A1* | 12/2016 | Roh | .................... | H01Q 5/328 |
| 2017/0047645 A1* | 2/2017 | Lin | .................... | H01Q 1/243 |
| 2017/0214132 A1* | 7/2017 | Jeon | .................... | H04B 5/0025 |
| 2017/0331175 A1* | 11/2017 | Kwon | .................... | H01Q 9/42 |
| 2017/0356980 A1* | 12/2017 | Islam | .................... | H01Q 3/24 |
| 2017/0373712 A1* | 12/2017 | Kim | .................... | H04B 7/0834 |
| 2018/0040950 A1* | 2/2018 | Lee | .................... | G06K 19/07779 |
| 2018/0351237 A1* | 12/2018 | Muhn | .................... | H01Q 21/28 |
| 2018/0351239 A1* | 12/2018 | Asrani | .................... | H01Q 1/243 |
| 2019/0165454 A1* | 5/2019 | Lee | .................... | H01Q 1/245 |
| 2019/0281146 A1* | 9/2019 | Jang | .................... | H01Q 1/243 |
| 2020/0028241 A1* | 1/2020 | Jung | .................... | H04M 1/02 |
| 2020/0127382 A1* | 4/2020 | Lee | .................... | H01Q 9/145 |
| 2020/0177223 A1* | 6/2020 | Fernando | .................... | H04B 1/3838 |
| 2020/0303814 A1* | 9/2020 | Lee | .................... | H02J 7/00045 |
| 2021/0066807 A1* | 3/2021 | Lee | .................... | H01Q 11/08 |
| 2021/0091816 A1* | 3/2021 | Noh | .................... | H04M 1/026 |
| 2021/0194131 A1* | 6/2021 | Do | .................... | H01Q 7/00 |
| 2022/0200133 A1* | 6/2022 | Thakur | .................... | H01Q 3/24 |
| 2022/0285825 A1* | 9/2022 | Lee | .................... | H01Q 1/38 |
| 2022/0344807 A1* | 10/2022 | You | .................... | H01Q 9/42 |
| 2023/0110427 A1* | 4/2023 | Lee | .................... | H01Q 1/02 |
| | | | | 343/725 |
| 2023/0129250 A1* | 4/2023 | Sung | .................... | H04M 1/72454 |
| | | | | 455/522 |

FOREIGN PATENT DOCUMENTS

| | | |
|---|---|---|
| KR | 10-2019-0008067 A | 1/2019 |
| KR | 10-2019-0014614 A | 2/2019 |

* cited by examiner

GRIP DETECTION METHOD AND ELECTRONIC DEVICE SUPPORTING SAME

CROSS-REFERENCE TO RELATED APPLICATION(S)

This application is based on and claims priority under 35 U.S.C. § 119(a) of a Korean patent application number 10-2019-0140373, filed on Nov. 5, 2019, in the Korean Intellectual Property Office, the disclosure of which is incorporated by reference herein in its entirety.

BACKGROUND

1) Field

The disclosure relates to a grip detection technology.

2) Description of Related Art

Recently, as mobile communication systems have been rapidly developed, demand for mobile communication services has been rapidly increasing. In particular, as demand for services using wireless communication have increased, the distribution of electronic devices including wireless communication modules is becoming more widespread. An electronic device supporting wireless communication is being made to be lightweight, thin, short, and small so as to secure efficient mobility of a system, and thus an antenna for wireless communication is also required to be lightweight, thin, short, and small while satisfying high gain properties.

Although transmission power is strong, a millimeter wave band frequency signal is not absorbed to a human body and may cause a bad influence, such as skin fever, on a human body. Thus, in case of an antenna (hereinafter, referred to as an mmWave antenna) which transmits or receives a millimeter wave band signal, the output intensity of a communication signal through the mmWave antenna may be reduced so as to satisfy a specification (for example, a maximum power emission (MPE) specification) for reducing transmission power of a signal to which a human body is exposed. In addition, in case of a legacy antenna, transmission power of an antenna may increase so as to improve transmission performance, and a specific absorption rate (SAR) about electromagnetic waves absorbed to a human body may increase thereby. A high SAR may cause a bad influence on a human body, and thus it is important that an electronic device including an antenna observes a standard SAR value. Accordingly, at the time of transmitting a signal by using an antenna, in order to observe SAR standards, an electronic device may reduce transmission power of an antenna if a part of the body of a user approaches or comes into contact with the electronic device. For example, an electronic device has a grip sensor connected to an antenna, wherein a grip in a region where the antenna is disposed or an adjacent region may be detected, and the output intensity of a communication signal through the antenna may be reduced when the grip is detected.

The above information is presented as background information only to assist with an understanding of the disclosure. No determination has been made, and no assertion is made, as to whether any of the above might be applicable as prior art with regard to the disclosure.

SUMMARY

It is difficult to provide an mmWave antenna via a method of realizing a pattern by using a metal frame or injection molding, and thus it may be difficult to directly connect a grip sensor to the antenna. Accordingly, a method of adding a separate sensing pad is used for an mmWave antenna, but it may be difficult to add a sensing pad to every antenna due to a problem that the internal space of an electronic device is narrow.

Aspects of the disclosure are to address at least the above-mentioned problems and/or disadvantages and to provide at least the advantages described below. Accordingly, an aspect of the disclosure is to provide a method for detecting a grip by using a separate antenna disposed in a wide region inside the rear surface of an electronic device, and an electronic device supporting same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front surface, a rear surface, and a side surface which at least partially surrounds a space between the front surface and the rear surface, a first antenna disposed in the space, a second antenna disposed substantially in parallel with the rear surface in the space and formed in a coil shape, a conductor spaced a predetermined distance apart from a partial region of the second antenna substantially in parallel therewith and at least partially overlapping the partial region when viewed from one direction of the electronic device, a sensor electrically connected to the conductor, a communication circuit electrically connected to the first antenna, and a processor electrically connected to the sensor and the communication circuit, wherein at least one of the second antenna or the conductor is disposed adjacent to the first antenna, and the processor is configured to acquire, through the sensor, a capacitance value related to the conductor, and reduce an intensity of a signal outputted through the first antenna according to the acquired capacitance value.

In accordance with another aspect of the disclosure, an electronic device is provided. The electronic device includes a housing including a front surface, a rear surface, and a side surface which at least partially surrounds a space between the front surface and the rear surface, an antenna disposed in the space and formed on a printed circuit board which includes a first conductor, a second conductor spaced a predetermined distance apart from the first conductor and at least partially overlapping the first conductor when viewed from one direction of the electronic device, a sensor electrically connected to the second conductor, a communication circuit electrically connected to the antenna, and a processor electrically connected to the sensor and the communication circuit, wherein the processor is configured to acquire, through the sensor, a capacitance value produced between the first conductor and the second conductor, and reduce an intensity of a signal outputted through the antenna according to the acquired capacitance value.

In accordance with another aspect of the disclosure, an electronic device is provided. The electronic device includes a housing including a front surface, a rear surface, and a side surface which at least partially surrounds a space between the front surface and the rear surface, a first antenna disposed in the space, a second antenna disposed substantially in parallel with the rear surface in the space and formed in a coil shape, a third antenna disposed substantially in parallel with the rear surface in the space, formed in a coil shape, spaced a predetermined distance apart from a partial region of the second antenna substantially in parallel therewith, and at least partially overlapping the partial region when viewed from one direction of the electronic device, a sensor electrically connected to the second antenna and the third antenna, a first communication circuit electrically connected to the first antenna, and a processor electrically connected to the sensor and the first communication circuit, wherein at least one of the second antenna or the third antenna is disposed adjacent to the first antenna, and the processor is configured to acquire, through the sensor, a capacitance value produced between the second antenna and the third antenna, and reduce an intensity of a signal outputted through the first antenna according to the acquired capacitance value.

According to various embodiments of the disclosure, a grip may be detected even without adding a separate sensing pad to every mmWave antenna, and thus the utilization of a mounting space in an electronic device may be improved.

In addition, according to various embodiments of the disclosure, even when a grip sensing pad is used to more accurately determine the position of a grip, the placing position of the grip sensing pad may be variously designed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
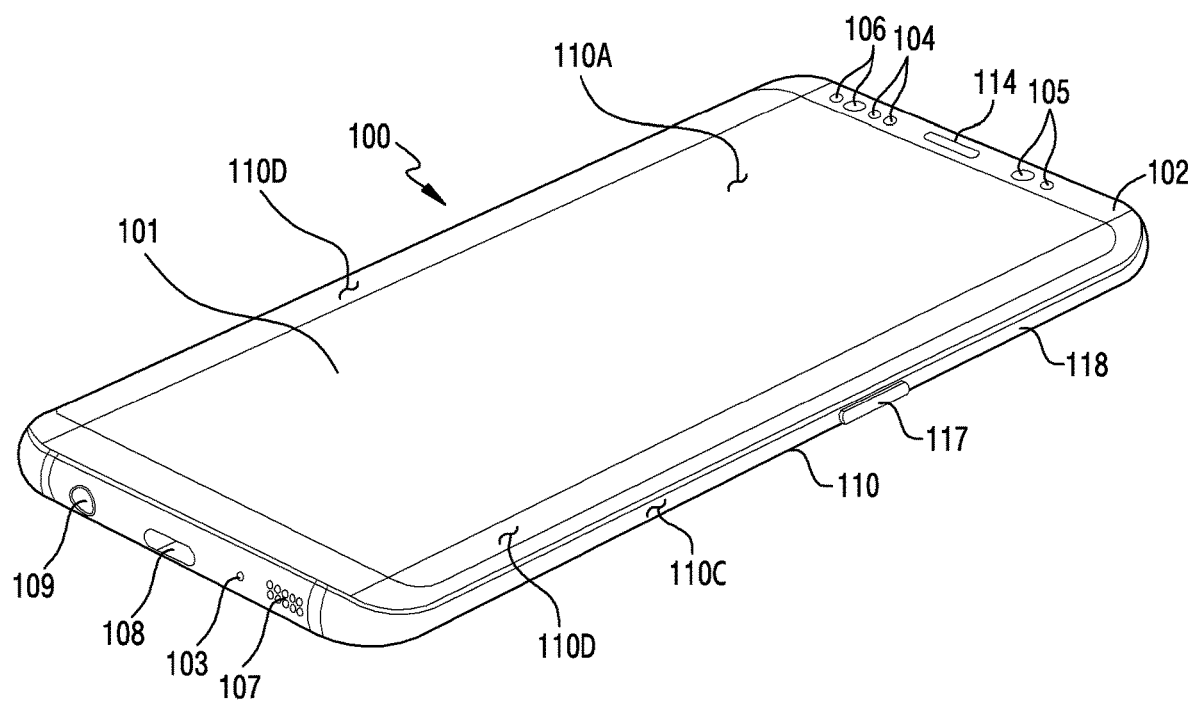
FIG. 1 is a perspective view of the front surface of a mobile electronic device according to an embodiment of the disclosure.
Figure 2:
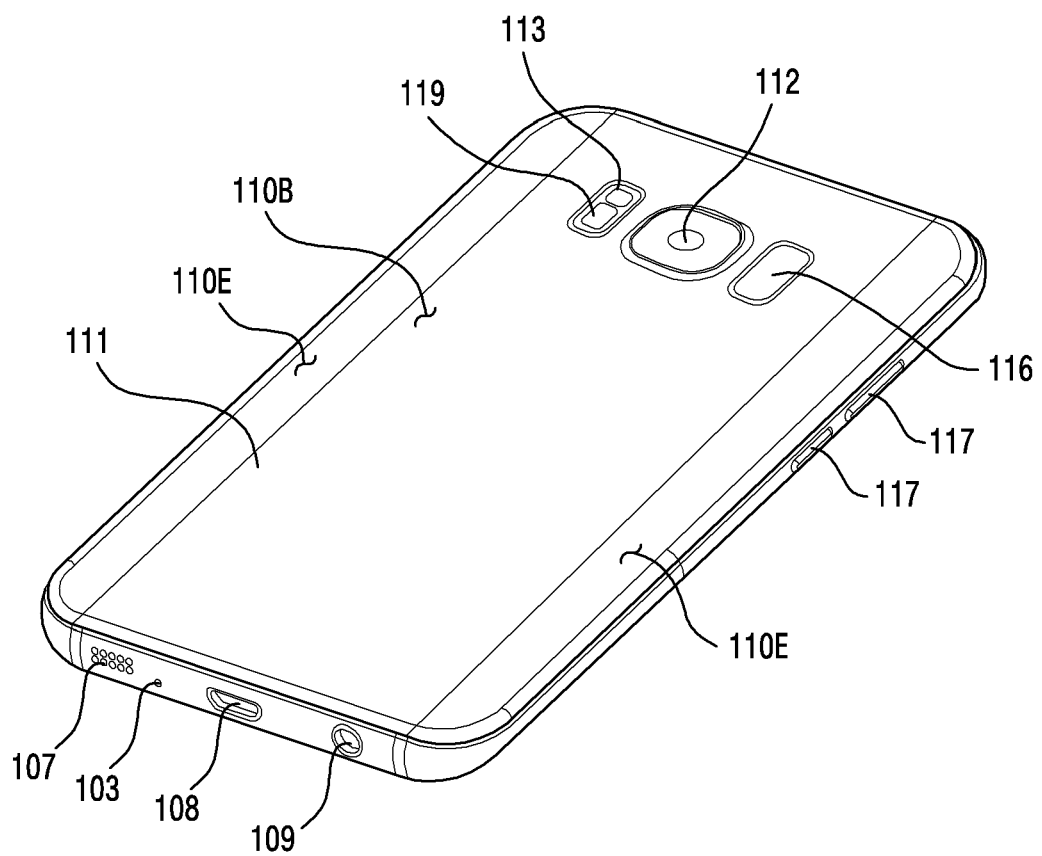
FIG. 2 is a perspective view of the rear surface of an electronic device of FIG. 1 according to an embodiment of the disclosure.

FIG. 1 is a front perspective view of a mobile electronic device according to an embodiment of the disclosure. FIG. 2 is a rear perspective view of the electronic device of FIG. 1 according to an embodiment of the disclosure.

Referring to FIGS. 1 and 2, the electronic device 100 according to an embodiment may include a housing 110 including a first face (or a front face) 110A, a second face (or a rear face) 110B, and a side face 110C surrounding the space between the first face 110A and the second face 110B. In another embodiment (not illustrated), the term "housing" may refer to a structure forming some of the first face 110A, the second face 110B, and the side face 110C of FIG. 1. According to an embodiment of the disclosure, at least a portion of the first face 110A may be formed of a substantially transparent front plate 102 (e.g., a glass plate or a polymer plate including various coating layers). The second face 110B may be formed by a substantially opaque rear plate 111. The rear plate 111 may be formed of, for example, coated or colored glass, ceramic, polymer, or metal (e.g., aluminum, stainless steel (STS), or magnesium), or a combination of two or more of these materials. The side face 110C may be formed by a side bezel structure 118 (or a "side member") coupled to the front plate 102 and the rear plate 111 and including a metal and/or a polymer. In some embodiments of the disclosure, the rear plate 111 and the side bezel structure 118 may be integrally formed, and may include the same material (e.g., a metal material, such as aluminum).

In an embodiment of the disclosure, the front plate 102 may include, at the long opposite side edges thereof, two first areas 110D, which are bent from the first face 110A towards the rear plate 111 and extend seamlessly. In the illustrated embodiment (see FIG. 2), the rear plate 111 may include, at the long opposite side edges thereof, two second areas 110E, which are bent from the second face 110B towards the front plate 102 and extend seamlessly. In some embodiments of the disclosure, the front plate 102 (or the rear plate 111) may include only one of the first areas 110D (or the second areas 110E). In an embodiment of the disclosure, some of the first areas 110D and the second areas 110E may not be included. In the embodiments described above, when viewed from a side of the electronic device 100, the side bezel structure 118 may have a first thickness (or width) on the side faces, which do not include the first areas 110D or the second areas 110E, and may have a second thickness (or width), which is smaller than the first thickness, on the side faces, which include the first areas 110D or the second areas 110E.

According to an embodiment of the disclosure, the electronic device 100 may include at least one of a display 101, audio modules 103, 107, and 114, sensor modules 104, 116, and 119, camera modules 105, 112, and 113, key input devices 117, light-emitting elements 106, and connector holes 108 and 109. In some embodiments of the disclosure, at least one of the components (e.g., the key input devices 117 or the light-emitting elements 106) may be omitted from the electronic device 100, or the electronic device 100 may additionally include other components.

According to an embodiment of the disclosure, the display 101 may be exposed through a large portion of, for example, the front plate 102. In some embodiments of the disclosure, at least a portion of the display 101 may be exposed through the front plate 102 forming the first face 110A and the first areas 110D of the side faces 110C. In some embodiments of the disclosure, the edges of the display 101 may be formed to be substantially the same as the shape of the periphery of the front plate 102 adjacent thereto. In another embodiment (not illustrated), the distance between the periphery of the display 101 and the periphery of the front plate 102 may be substantially constant in order to enlarge the exposed area of the display 101.

In another embodiment (not illustrated), a recess or an opening may be formed in a portion of the screen display area of the display 101, and at least one of the audio module 114, the sensor module 104, the camera module 105, and the light-emitting elements 106 may be aligned with the recess or the opening. In another embodiment (not illustrated), the rear face of the screen display area of the display 101 may include at least one of the audio module 114, the sensor module 104, the camera module 105, the fingerprint sensor 116, and the light-emitting elements 106. In another embodiment (not illustrated), the display 101 may be coupled to or disposed adjacent to a touch-sensitive circuit, a pressure sensor that is capable of measuring a touch intensity (pressure), and/or a digitizer that detects a magnetic-field-type stylus pen. In some embodiments of the disclosure, at least some of the sensor modules 104 and 119 and/or at least some of the key input devices 117 may be disposed in the first areas 110D and/or the second areas 110E.

According to an embodiment of the disclosure, the audio modules 103, 107, and 114 may include a microphone hole 103 and speaker holes 107 and 114. The microphone hole 103 may include a microphone disposed therein so as to acquire external sound, and in some embodiments of the disclosure, multiple micro phones may be disposed therein so as to detect the direction of sound. The speaker holes 107 and 114 may include an external speaker hole 107 and a phone call receiver hole 114. In some embodiments of the disclosure, the speaker holes 107 and 114 and the microphone hole 103 may be implemented as a single hole, or a speaker may be included without the speaker holes 107 and 114 (e.g., a piezo speaker).

According to an embodiment of the disclosure, the sensor modules 104, 116, and 119 may generate an electrical signal or a data value corresponding to the internal operating state or the external environmental state of the electronic device 100. The sensor modules 104, 116, and 119 may include, for example, a first sensor module 104 (e.g., a proximity sensor), a second sensor module (not illustrated) (e.g., a fingerprint sensor) disposed on the first face 110A of the housing 110, a third sensor module 119 (e.g., an HRM sensor), and/or a fourth sensor module 116 (e.g., a fingerprint sensor) disposed on the second face 110B of the housing 110. The fingerprint sensor may be disposed not only on the first face 110A of the housing 110 (e.g., the display 101), but also on the second face 110B. The electronic device 100 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment of the disclosure, the camera modules 105, 112, and 113 may include, for example, a first camera device 105 disposed on the first face 110A of the electronic device 100 and a second camera device 112 and/or a flash 113 disposed on the second face 110B of the electronic device 100. The camera modules 105 and 112 may include one or more lenses, an image sensor, and/or an image signal processor. The flash 113 may include, for example, a light emitting diode or a xenon lamp. In some embodiments of the disclosure, two or more lenses (e.g., an infrared camera lens, a wide-angle lens, and a telephoto lens) and image sensors may be disposed on one face of the electronic device 100.

According to an embodiment of the disclosure, the key input devices 117 may be disposed on the side face 110C of the housing 110. In another embodiment of the disclosure, the electronic device 100 may not include some or all of the above-mentioned key input devices 117, and a key input device 117, which is not included in the electronic device 100, may be implemented in another form, such as that of a soft key or the like, on the display 101. In some embodiments of the disclosure, the key input devices 117 may include a sensor module 116 disposed on the second face 110B of the housing 110.

According to an embodiment of the disclosure, the light-emitting element 106 may be disposed on, for example, the first face 110A of the housing 110. The light-emitting element 106 may provide, for example, information about the state of the electronic device 100 in an optical form. In another embodiment of the disclosure, the light-emitting element 106 may provide a light source that is interlocked with, for example, the operation of the camera module 105. The light-emitting element 106 may include, for example, an LED, an IR LED, and a xenon lamp.

The connector holes 108 and 109 may include a first connector hole 108 that is capable of accommodating a connector (e.g., a USB connector) for transmitting and receiving power and/or data to and from an external electronic device, and/or a second connector hole 109 that is capable of receiving a connector (e.g., an earphone jack) for transmitting and receiving an audio signal to and from an electronic device.

Figure 3:
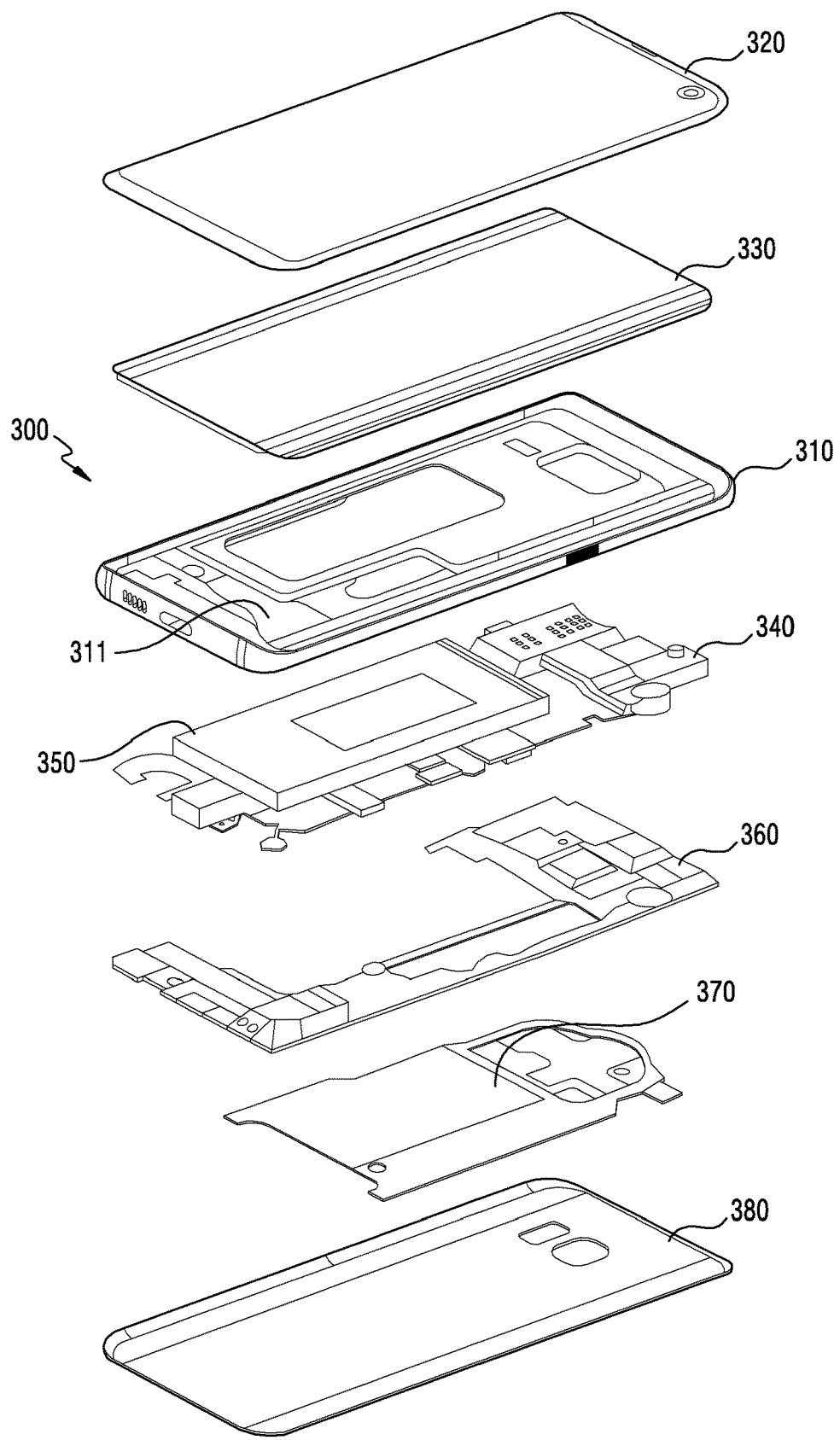
FIG. 3 is a deployed perspective view of an electronic device of FIG. 1 according to an embodiment of the disclosure.

FIG. 3 is an exploded perspective view of the electronic device of FIG. 1 according to an embodiment of the disclosure.

Referring to FIG. 3, an electronic device 300 (e.g., the electronic device 100 in FIGS. 1 and 2) may include a side bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments of the disclosure, at least one of the components (e.g., the first support member 311 or the second support member 360) may be omitted from the electronic device 300, or the electronic device 300 may additionally include other components. At least one of the components of the electronic device 300 may be the same as or similar to at least one of the components of the electronic device 100 of FIG. 1 or 2, and a redundant description thereof is omitted below.

According to an embodiment of the disclosure, the first support member 311 may be disposed inside the electronic device 300 so as to be connected to the side bezel structure 310, or the first support member 311 may be integrally formed with the side bezel structure 310. The first support member 311 may be formed of, for example, a metal material and/or a non-metal material (e.g., a polymer). The display 330 may be coupled to one face of the first support member 311, and the printed circuit board 340 may be coupled to the other face of the first support member 311.

On the printed circuit board 340, a processor, memory, and/or an interface may be mounted. The processor may include at least one of, for example, a central processing unit (CPU), an application processor, a graphics processor, an image signal processor, a sensor hub processor, or a communication processor. According to an embodiment of the disclosure, the memory may include, for example, volatile memory or nonvolatile memory. According to an embodiment of the disclosure, the interface may include, for example, a high-definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/an MMC connector, or an audio connector.

According to an embodiment of the disclosure, the battery 350 is a device for supplying power to at least one component of the electronic device 300, and may include, for example, a non-rechargeable primary battery, a rechargeable secondary battery, or a fuel cell. At least a portion of the battery 350 may be disposed on substantially the same plane as, for example, the printed circuit board 340. The battery 350 may be integrally disposed within the electronic device 300, or may be detachably mounted on the electronic device 300.

According to an embodiment of the disclosure, the antenna 370 may be disposed between the rear plate 380 and the battery 350. The antenna 370 may include, for example, a nearfield communication (NFC) antenna, a wireless charging antenna, and/or a magnetic secure transmission (MST) antenna. The antenna 370 may perform short-range communication with, for example, an external electronic device, or may transmit/receive power required for charging to/from the external device in a wireless manner. In another embodiment of the disclosure, an antenna structure may be formed by the side bezel structure 310, a portion of the first support member 311, or a combination thereof.

Figure 4:
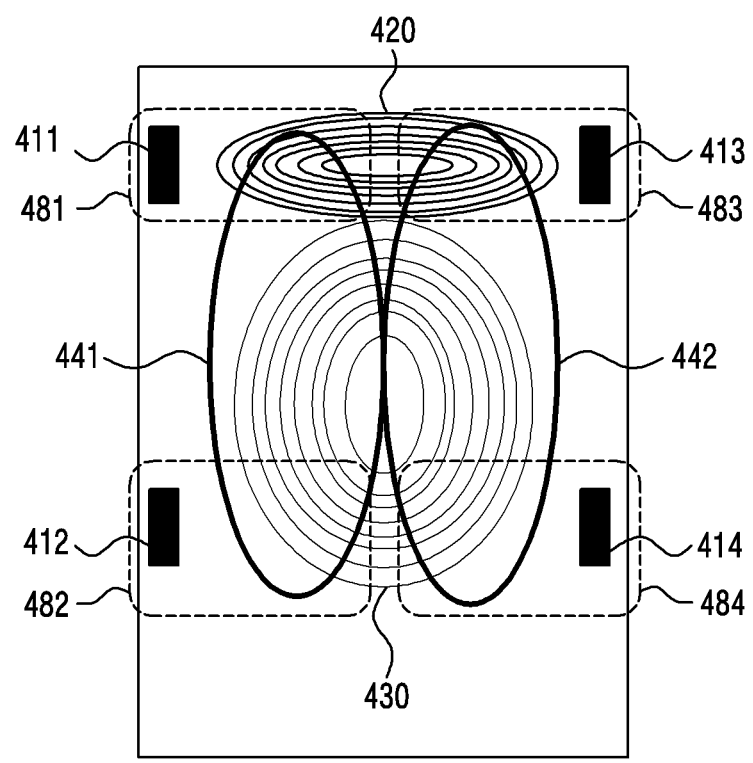
FIG. 4 shows a placing shape of an mmWave antenna module and an antenna disposed in a wide region inside the rear surface of an electronic device, according to an embodiment of the disclosure.
Figure 5:
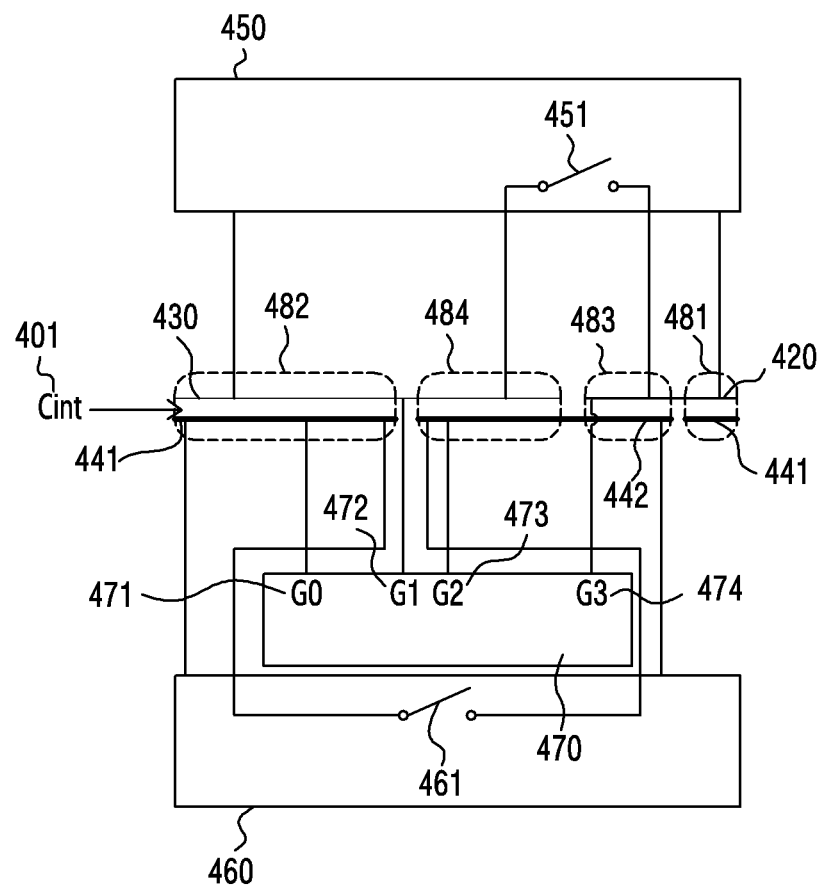
FIG. 5 is a view for explaining a method for detecting a grip by using an antenna disposed in a wide region inside the rear surface of an electronic device, according to an embodiment of the disclosure.

FIG. 4 shows a placing shape of an mmWave antenna module and an antenna disposed in a wide region inside the rear surface of an electronic device, according to an embodiment of the disclosure, and FIG. 5 is a view for explaining a method for detecting a grip by using an antenna disposed in a wide region inside the rear surface of an electronic device, according to an embodiment of the disclosure.

Referring to FIG. 4 and FIG. 5, an electronic device (for example: an electronic device 100 or 300) may include an antenna module (an mmWave antenna module) 411, 412, 413, or 414 which transmits or receives a millimeter wave band signal. When a signal is transmitted using the mmWave antenna module 411, 412, 413, or 414, the electronic device (for example: a processor) may reduce the output intensity of a communication signal through the mmWave antenna module 411, 412, 413, or 414 so as to observe an MPE spec and SAR standards if a part of the body of a user approaches or comes into contact (for example: grips) the electronic device in a region where the mmWave antenna module 411, 412, 413, or 414 is disposed or an adjacent region.

In case of an mmWave antenna module 411, 412, 413, or 414, it may be difficult to directly connect a grip sensor for detecting a grip, and thus it may be difficult to add a separate sensing pad to every mmWave antenna module 411, 412, 413, or 414 due to a problem that the internal space of an electronic device is narrow. Accordingly, in the disclosure, in order to detect a grip in a region where an mmWave antenna module 411, 412, 413, or 414 is disposed or an adjacent region, at least one antenna (for example: an antenna 370) disposed in a wide region inside the rear surface of an electronic device may be used. As an example, based on a capacitance value produced between a plurality of antennas disposed inside the rear surface of an electronic device, the electronic device may detect a grip. At this time, the plurality of antennas may overlap each other in at least a partial region when viewed from above the front surface of the electronic device, and the overlapping region may be adjacent to an mmWave antenna module 411, 412, 413, or 414. Accordingly, based on a capacitance value (for example: a change amount in a capacitance value) in a region where a plurality of antennas overlap each other, a grip in the overlapping region may be detected, and when the grip is detected in the overlapping region, the output intensity of a communication signal through an mmWave antenna module 411, 412, 413, or 414 disposed adjacent to the overlapping region may be reduced.

An antenna may be disposed in a wide region inside the rear surface of an electronic device and may have at least a part disposed adjacent to an mmWave antenna module 411, 412, 413, or 414. According to an embodiment of the disclosure, the antenna may include an antenna formed in a coil shape. For example, the antenna may include at least one among an MST antenna 420, a wireless charging antenna 430, or an NFC antenna 441 or 442.

Referring to FIG. 4, in a placing shape of an mmWave antenna module 411, 412, 413, or 414 and an antenna, the mmWave antenna module 411, 412, 413, or 414 may be disposed adjacent to the side surface of an electronic device. For example, a first mmWave antenna module 411 may be disposed at the upper end of the left side surface of an electronic device, a second mmWave antenna module 412 may be disposed at the lower end of the left side surface of the electronic device, a third mmWave antenna module 413 may be disposed at the upper end of the right side surface of the electronic device, and a fourth mmWave antenna module 414 may be disposed at the lower end of the right side surface of the electronic device. The number of mmWave antenna modules 411, 412, 413, or 414 is not limited thereto. According to various embodiments of the disclosure, at least one among the above-described antenna modules 411, 412, 413, and 414 may be omitted, and at least another mmWave antenna module other than the antenna modules 411, 412, 413, and 414 may be further disposed. Each of the mmWave antenna modules 411, 412, 413, and 414 may include a plurality of conductive patches, and each of the plurality of conductive patches may function as an antenna. The structure of an mmWave antenna module 411, 412, 413, or 414 will be described with reference to FIGS. 13A, 13B, and 13C.

An antenna may be disposed to occupy a wide region inside the rear surface of an electronic device. For example, a wireless charging antenna 430 may be disposed at the central portion of an electronic device, an MST antenna 420 may be disposed at the upper end of the wireless charging antenna 430, and an NFC antenna 441 or 442 may be disposed at the central portion of the electronic device. According to an embodiment of the disclosure, an NFC antenna 441 or 442 may be disposed after being divided into a plurality of pieces. For example, a first NFC antenna 441 may be disposed at the left of the central portion of an electronic device, and a second NFC antenna 442 may be disposed at the right of the central portion of the electronic device.

As illustrated in FIG. 5, NFC antennas 441 and 442 may be laminated while being spaced a predetermined distance apart from each other under an MST antenna 420 and a wireless charging antenna 430. At this time, at least a part of the NFC antennas 441 and 442 and at least a part of the MST antenna 420 may be disposed substantially in parallel with each other, and at least a part of the NFC antennas 441 and 442 and at least a part of the wireless charging antenna 430 may be disposed substantially in parallel with each other. Accordingly, a capacitance $C_{int}$ 401 may be produced between two antennas as two conductors. For example, a capacitance may be produced between at least a part of the NFC antennas 441 and 442 and at least a part of the MST antenna 420, which are disposed in parallel with each other, and a capacitance may also be produced between at least a part of the NFC antennas 441 and 442 and at least a part of the wireless charging antenna 430.

According to an embodiment of the disclosure, an electronic device (for example, a processor) may acquire a first capacitance value produced between an MST antenna 420 disposed at the upper end of the central portion of the electronic device and a first NFC antenna 441 disposed at the left of the central portion of the electronic device, acquire a second capacitance value produced between a wireless charging antenna 430 disposed at the central portion of the electronic device and the first NFC antenna 441 disposed at the left of the central portion of the electronic device, acquire a third capacitance value produced between the MST antenna 420 disposed at the upper end of the central portion of the electronic device and a second NFC antenna 442 disposed at the right of the central portion of the electronic device, and acquire a fourth capacitance value produced between the wireless charging antenna 430 disposed at the central portion of the electronic device and the second NFC antenna 442 disposed at the right of the central portion of the electronic device. Accordingly, an electronic device (for example: a processor) may determine, based on an acquired first capacitance value, a grip in a left upper end region 481 of the electronic device including a region where a first mmWave antenna module 411 is disposed and an adjacent region, may determine, based on an acquired second capacitance value, a grip in a left lower end region 482 of the electronic device including a region where a second mmWave antenna module 411 is disposed and an adjacent region, may determine, based on an acquired third capacitance value, a grip in a right upper end region 483 of the electronic device including a region where a third mmWave antenna module 413 is disposed and an adjacent region, and may determine, based on an acquired fourth capacitance value, a grip in a right lower end region 484 of the electronic device including a region where a fourth mmWave antenna module 414 is disposed and an adjacent region.

An MST antenna 420 and a wireless charging antenna 430 may be connected through a first switch 451 in a first circuit (for example: WPC+MST IC) 450. A first switch 451 may be opened during wireless charging and grip detection operations and may be short-circuited during MST and NFC operations.

An NFC antenna 441 or 442 may be disposed after being divided into a plurality of pieces. An NFC antenna 441 or 442 may include, for example, a first NFC antenna 441 disposed at the left of the central portion of an electronic device or a second NFC antenna 442 disposed at the right of the central portion of the electronic device. A first NFC antenna 441 and a second NFC antenna 442 may be connected through a second switch 461 in a second circuit (for example: an NFC IC) 460. A second switch 461 may be short-circuited during an NFC operation to connect a first NFC antenna 441 and a second NFC antenna 442 and may be opened during a grip detection operation to separate the first NFC antenna 411 and the second NFC antenna 442. When the second switch 461 is opened, each of a first NFC antenna 411 and a second NFC antenna 442 may be used for a grip detection operation in the left and right regions of an electronic device.

A grip sensor 470 may detect a grip by using a capacitance value produced between two conductors. A first NFC antenna 441 may be connected to a first port G0 471 of a grip sensor 470, a wireless charging antenna 430 may be connected to a second port G1 472 of the grip sensor 470, a second NFC antenna 442 may be connected to a third port G2 473 of the grip sensor 470, an MST antenna 420 may be connected to a fourth port G3 474 of the grip sensor 470. Accordingly, a grip sensor 470 may detect: a grip in a left lower end region 482 of an electronic device when a capacitance value (for example: a second capacitance value) between a first port 471 and a second port 472 changes, a grip in a right lower end region 484 of the electronic device when a capacitance value (for example: a fourth capacitance value) between the second port 472 and a third port 473 changes, a grip in a right upper end region 483 of the electronic device when a capacitance value (for example: a third capacitance value) between the third port 473 and a fourth port 474 changes, and a grip in a left upper end region 481 of the electronic device when a capacitance value (for example: a first capacitance value) between the fourth port 474 and the first port 471 changes.

According to an embodiment of the disclosure, a method of detecting the value of capacitance 401 produced between two conductors may be a mutual-capacitance method.

According to an embodiment of the disclosure, in order to detect the value of capacitance 401 produced between the two conductors, ports of a grip sensor 470 may operate as a driving line and a sensing line.

When a grip is detected by a grip sensor 470, an electronic device (for example: a processor) may reduce the output intensity of a communication signal through an mmWave antenna module 411, 412, 413, or 414 disposed in a region where a grip is detected or an adjacent region. For example, an electronic device may reduce: the output intensity of an RF path connected to a first mmWave antenna module 411 disposed in a left upper end region 481 of the electronic device when a grip is detected in the left upper end region 481 of the electronic device, the output intensity of an RF path connected to a second mmWave antenna module 412 disposed in a left lower end region 482 of the electronic device when a grip is detected in the left lower end region 482 of the electronic device, the output intensity of an RF path connected to a third mmWave antenna module 413 disposed in a right upper end region 483 of the electronic device when a grip is detected in the right upper end region 483 of the electronic device, and the output intensity of an RF path connected to a fourth mmWave antenna module 414 disposed in a right lower end region 484 of the electronic device when a grip is detected in the right lower end region 484 of the electronic device. According to an embodiment of the disclosure, when a grip is detected by a grip sensor 470, an electronic device (for example: a processor) may reduce the output intensity of a communication signal through a legacy antenna disposed in a region where the grip is detected or an adjacent region.

In the description above, a grip detection operation for 2*2(4) number of regions was explained via a first switch 451 and a second switch 461, but is not limited thereto. According to various embodiments of the disclosure, by variously designing the number of antennas (for example: coils) (for example: an NFC antenna 441 or 442, a wireless charging antenna 430, and an MST antenna 420) used to detect a grip and the number of switches (for example: a first switch 451 and a second switch 461) for connecting the antennas, a grip in N*M number of regions may be detected.

Figure 6:
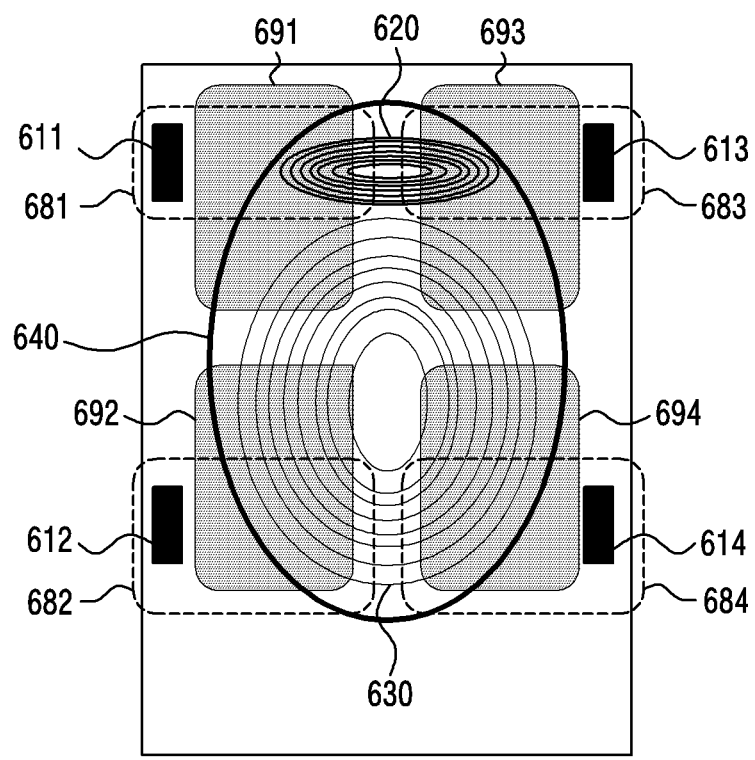
FIG. 6 shows a placing shape of an mmWave antenna module, an antenna disposed in a wide region inside the rear surface of an electronic device, and a grip sensing pad, according to an embodiment of the disclosure.
Figure 7:
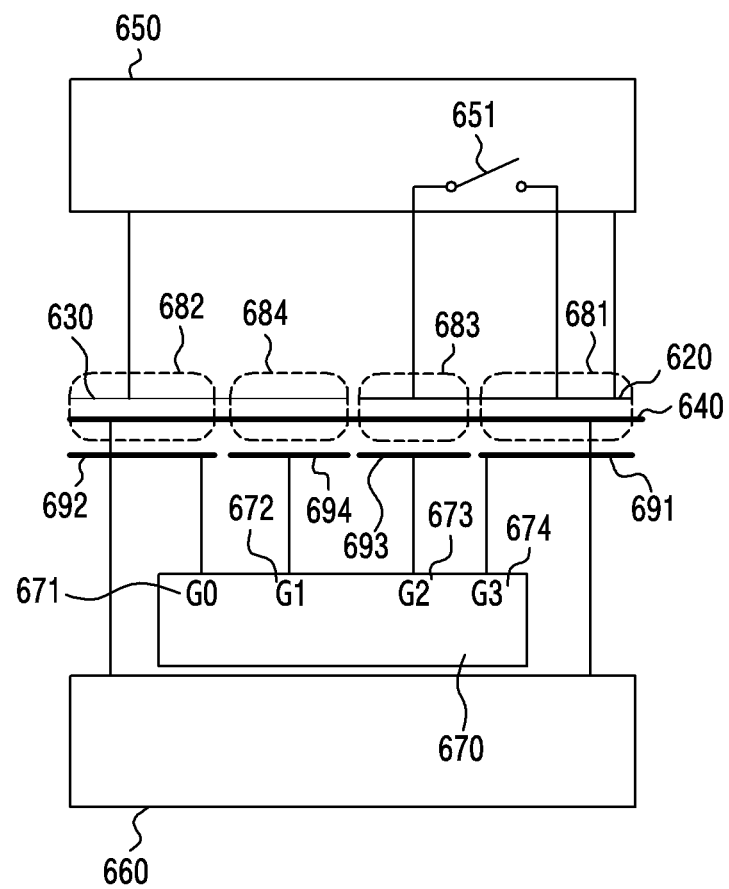
FIG. 7 is a view for explaining a method for detecting a grip by using a grip sensing pad and an antenna disposed in a wide region inside the rear surface of an electronic device, according to an embodiment of the disclosure.

FIG. 6 shows a placing shape of an mmWave antenna module, an antenna disposed in a wide region inside the rear surface of an electronic device, and a grip sensing pad, according to an embodiment of the disclosure, and FIG. 7 is a view for explaining a method for detecting a grip by using a grip sensing pad and an antenna disposed in a wide region inside the rear surface of an electronic device, according to an embodiment of the disclosure.

Referring to FIG. 6 and FIG. 7, an electronic device (for example: an electronic device 100 or 300) may include a grip sensing pad 691, 692, 693, or 694 for detecting a grip. According to an embodiment of the disclosure, a grip sensing pad 691, 692, 693, or 694 may include a coil-shaped conductor. A grip sensing pad 691, 692, 693, or 694 may be disposed adjacent to an mmWave antenna module 611, 612, 613, or 614 so as to more accurately determine the position of a grip. For example, a first grip sensing pad 691 may be disposed adjacent to a first mmWave antenna module 611 disposed in a left upper end region 681 of an electronic device, a second grip sensing pad 692 may be disposed adjacent to a second mmWave antenna module 612 disposed in a left lower end region 682 of the electronic device, a third grip sensing pad 693 may be disposed adjacent to a third mmWave antenna module 613 disposed in a right upper end region 683 of the electronic device, and a fourth grip sensing pad 694 may be disposed adjacent to a fourth mmWave antenna module 614 disposed in a right lower end region 684 of the electronic device.

A grip sensing pad 691, 692, 693, or 694 may be laminated while being spaced a predetermined distance apart from an antenna (for example: an antenna 370) disposed to occupy a wide region inside the rear surface of an electronic device. For example, a first grip sensing pad 691 may be disposed substantially in parallel with at least a part of an MST antenna 620, a wireless charging antenna 630, or an NFC antenna 640, a second grip sensing pad 692 may be disposed substantially in parallel with at least a part of the wireless charging antenna 630 or the NFC antenna 640, a third grip sensing pad 693 may be disposed substantially in parallel with at least a part of the MST antenna 620, the wireless charging antenna 630, or the NFC antenna 640, and a fourth grip sensing pad 694 may be disposed substantially in parallel with at least a part of the wireless charging antenna 630 or the NFC antenna 640. Accordingly, capacitance may be produced between a sensing pad and an antenna as two conductors. For example, capacitance may be produced between a first grip sensing pad 691 and at least a part of an MST antenna 620, a wireless charging antenna 630, or an NFC antenna 640 disposed in parallel with the first grip sensing pad 691. Likewise, capacitance may be produced between a second grip sensing pad 692, a third grip sensing pad 693, or a fourth grip sensing pad 694 and at least a part of an MST antenna 620, a wireless charging antenna 630, or an NFC antenna 640.

According to an embodiment of the disclosure, an electronic device (for example: a processor) may acquire a first capacitance value produced between an MST antenna 620 disposed at the upper end of the central portion of the electronic device or a wireless charging antenna 630 or an NFC antenna 640 disposed at the central portion of the electronic device and a first grip sensing pad 691 disposed at the left upper end of the electronic device, a second capacitance value produced between the wireless charging antenna 630 or the NFC antenna 640 disposed at the central portion of the electronic device and a second grip sensing pad 692 disposed at the left lower end of the electronic device, a third capacitance value produced between the MST antenna 620, the wireless charging antenna 630, or the NFC antenna 640 and a third grip sensing pad 693 disposed at the right upper end of the electronic device, and a fourth capacitance value produced between the wireless charging antenna 630 or the NFC antenna 640 and a fourth grip sensing pad 694 disposed at the right lower end of the electronic device. Accordingly, an electronic device (for example: a processor) may determine a grip in a left upper end region 681 of the electronic device including a region where a first mmWave antenna module 611 is disposed and an adjacent region, based on an acquired first capacitance value, a grip in a left lower end region 682 of the electronic device including a region where a second mmWave antenna module 612 is disposed and an adjacent region, based on an acquired second capacitance value, a grip in a right upper end region 683 of the electronic device including a region where a third mmWave antenna module 613 is disposed and an adjacent region, based on an acquired third capacitance value, and a grip in a right lower end region 684 of the electronic device including a region where a fourth mmWave antenna module 614 is disposed and an adjacent region, based on an acquired fourth capacitance value.

An MST antenna 620 and a wireless charging antenna 630 may be connected through a switch 651 in a first circuit (for example: WPC+MST IC) 650. In addition, an NFC antenna 640 may be connected to a second circuit (for example: an NFC IC) 660.

A grip sensor 670 may detect a grip by using a capacitance value produced between two conductors. A second grip sensing pad 692 may be connected to a first port G0 671 of a grip sensor 670, a fourth grip sensing pad 694 may be connected to a second port G1 672 of the grip sensor 670, a third grip sensing pad 693 may be connected to a third port G2 673 of the grip sensor 670, a first grip sensing pad 691 may be connected to a fourth port G3 674 of the grip sensor 670. Accordingly, a grip sensor 670 may detect a grip in a left lower end region 682 of an electronic device, based on a capacitance value (for example: a second capacitance value) acquired through a first port 671, a grip in a right lower end region 684 of the electronic device, based on a capacitance value (for example: a fourth capacitance value) acquired through a second port 672, a grip in a right upper end region 683 of the electronic device, based on a capacitance value (for example: a third capacitance value) acquired through a third port 673, and a grip in a left upper end region 681 of the electronic device, based on a capacitance value (for example: a first capacitance value) acquired through a fourth port 674.

When a grip is detected by a grip sensor 670, an electronic device (for example: a processor) may reduce the output intensity of a communication signal through an mmWave antenna module 611, 612, 613, or 614 disposed in a region where a grip is detected or an adjacent region. For example, an electronic device may reduce: the output intensity of an RF path connected to a first mmWave antenna module 611 disposed in a left upper end region 681 of the electronic device when a grip is detected in the left upper end region 681 of the electronic device, the output intensity of an RF path connected to a second mmWave antenna module 612 disposed in a left lower end region 682 of the electronic device when a grip is detected in the left lower end region 682 of the electronic device, the output intensity of an RF path connected to a third mmWave antenna module 613 disposed in a right upper end region 683 of the electronic device when a grip is detected in the right upper end region 683 of the electronic device, and the output intensity of an RF path connected to a fourth mmWave antenna module 614 disposed in a right lower end region 684 of the electronic device when a grip is detected in the right lower end region 684 of the electronic device.

In the description above, a grip detection operation using four grip sensing pads 691, 692, 693, and 694 disposed at the left upper end, left lower end, right upper end, and right lower end of an electronic device was explained, but is not limited thereto. According to various embodiments of the disclosure, at least one among the above-described grip sensing pads 691, 692, 693, and 694 may be omitted, and at least another grip sensing pad other than the grip sensing pads 691, 692, 693, and 694 may be further disposed. For example, the placing number and the placing position of grip sensing pads 691, 692, 693, or 694 may be variously designed so as to more accurately determine the position of a grip.

Figure 8A:
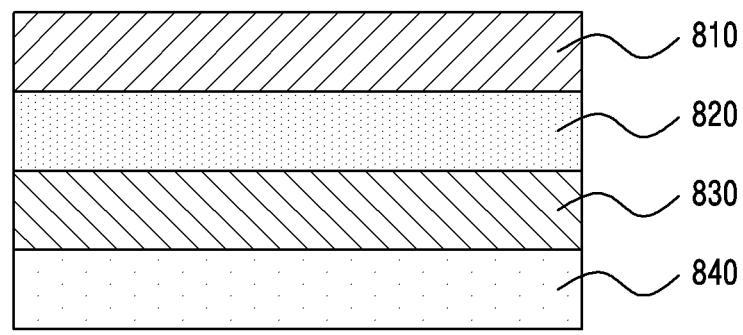
FIG. 8A is a view for explaining a laminated structure of a grip sensing pad and an antenna disposed in a wide region inside the rear surface of an electronic device, according to an embodiment of the disclosure.
Figure 8B:
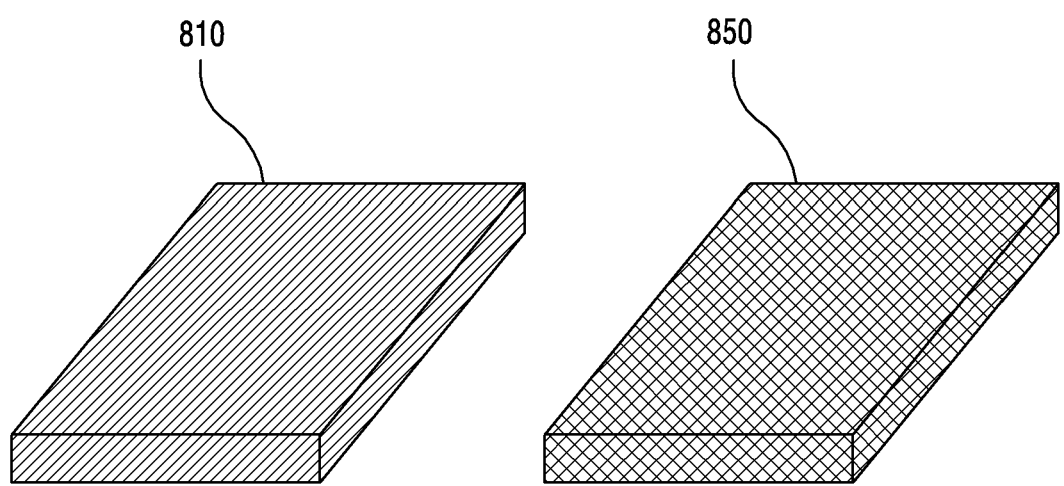
FIG. 8B is a view for explaining a grip detection method using an antenna disposed in a wide region inside the rear surface of an electronic device and a conductive pattern disposed while being spaced apart from the antenna, according to an embodiment of the disclosure.

FIG. 8A is a view for explaining a laminated structure of a grip sensing pad and an antenna disposed in a wide region inside the rear surface of an electronic device, according to an embodiment of the disclosure, and FIG. 8B is a view for explaining a grip detection method using an antenna disposed in a wide region inside the rear surface of an electronic device and a conductive pattern disposed while being spaced apart from the antenna, according to an embodiment of the disclosure.

Referring to FIG. 8A, an electronic device (for example: an electronic device 100 or 300) may detect a grip, based on a capacitance value produced between a grip sensing pad 830 (for example: a grip sensing pad 691, 692, 693, or 694) and an antenna 810 (for example: an antenna 370, an MST antenna 420 or 620, a wireless charging antenna 430 or 630, or an NFC antenna 441, 442, or 640) disposed to occupy a wide region inside the rear surface of the electronic device. For example, since a grip sensing pad 830 and an antenna 810 are disposed substantially in parallel with each other at least partially and are laminated while being spaced a predetermined distance apart from each other, capacitance may be produced between the grip sensing pad 830 and the antenna 810, and an electronic device may detect a grip by using the value of the capacitance.

In a laminated structure of a grip sensing pad 830 and an antenna 810, an electromagnetic wave absorption member 820 may be disposed between the grip sensing pad 830 and the antenna 810, and a battery 840 may be disposed under the grip sensing pad 830. An electromagnetic wave absorption member 820 may be scattered in a metal powder type onto a surface where a grip sensing pad 830 is in contact with an antenna 810, so as to form a layer. For example, since an electromagnetic wave absorption member 820 is scattered in a powder type and the area of a metal material may be disregarded, a capacitance value between a grip sensing pad 830 and an antenna 810 may not be affected. Accordingly, it may be possible to detect a grip through an electromagnetic wave absorption member 820 without degradation of an antenna 810.

According to an embodiment of the disclosure, as in FIG. 8B, an electronic device may detect a grip, based on a capacitance value produced between an antenna 810 and a conductive pattern 850 disposed while being spaced apart from the antenna 810. In this case, an electronic device may omit a grip sensing pad 830 illustrated in FIG. 8A. According to an embodiment of the disclosure, an antenna 810 and a conductive pattern 850 may be spaced a predetermined distance apart from each other in the side surface direction of an electronic device. A conductive pattern 850 may include, for example, at least one among a radiator pattern or wiring of a separate antenna disposed in an electronic device, or a separate grip sensing pad.

According to an embodiment of the disclosure, a grip sensing pad 830 and an antenna 810 may not overlap each other. In this case, the grip sensing pad 830 or the antenna 810 may detect a grip, based on a capacitance value produced between the grip sensing pad 830 or the antenna 810 and an mmWave antenna module or a legacy antenna adjacent thereto.

Figure 9:
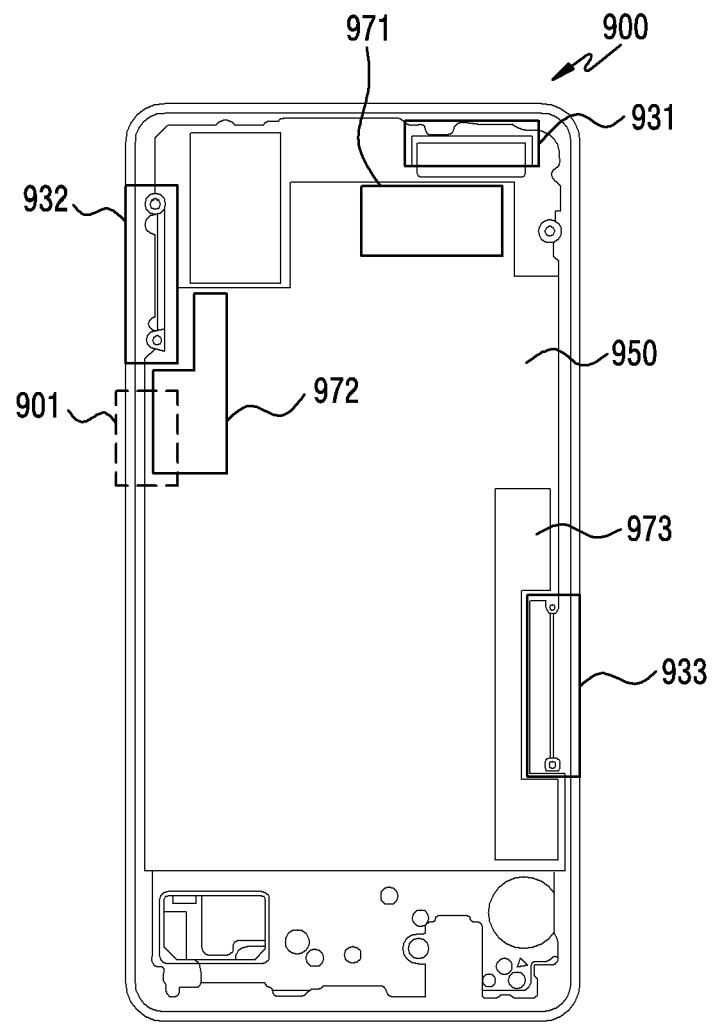
FIG. 9 is a view for explaining a placing position of an mmWave antenna module and a grip sensing pad in an electronic device, according to an embodiment of the disclosure.
Figure 10:
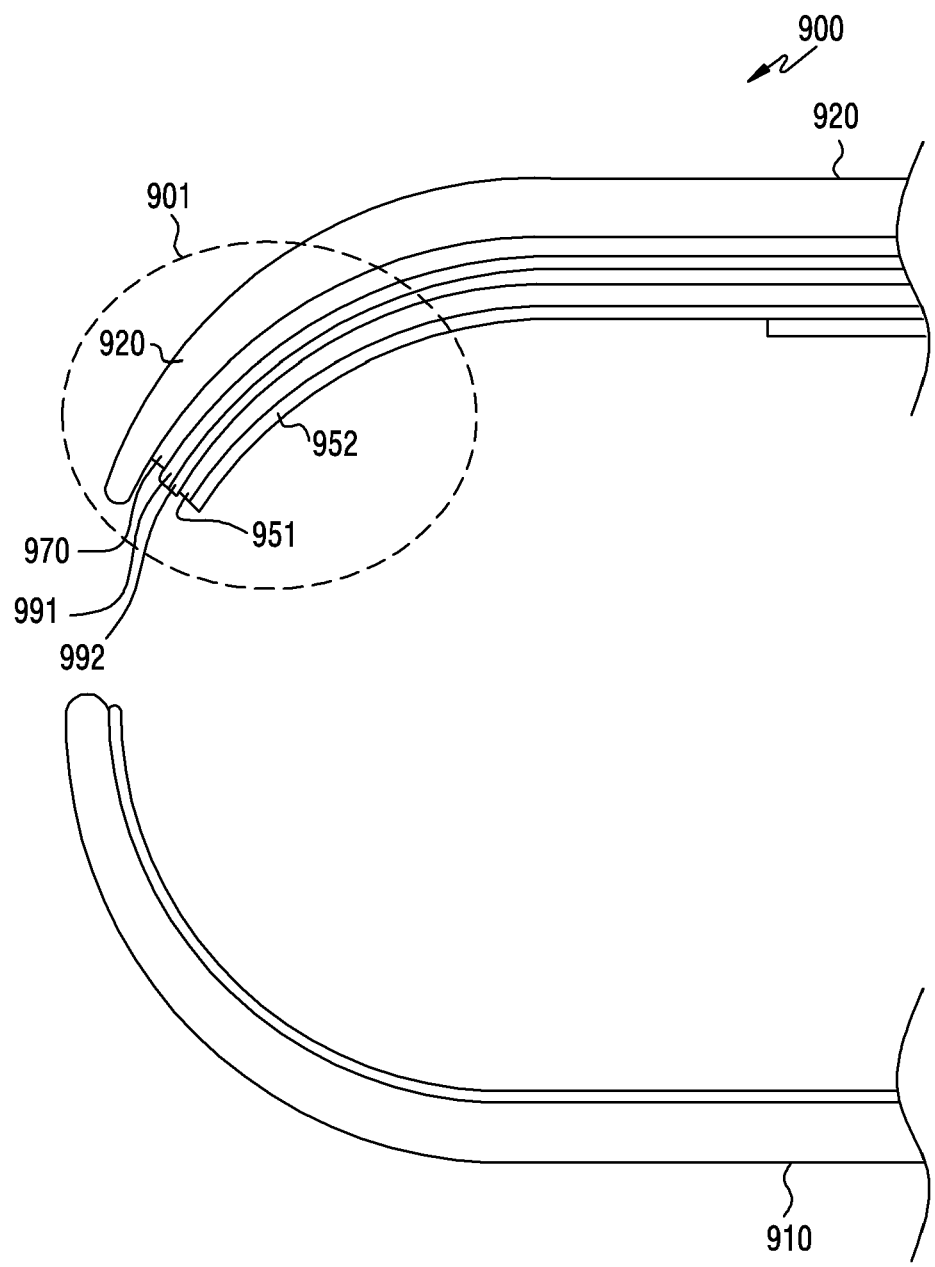
FIG. 10 is a view for explaining a method for extending a grip sensing region, according to an embodiment of the disclosure.

FIG. 9 is a view for explaining a placing position of an mmWave antenna module and a grip sensing pad in an electronic device, according to an embodiment of the disclosure, and FIG. 10 is a view for explaining a method for extending a grip sensing region, according to an embodiment of the disclosure.

Referring to FIG. 9 and FIG. 10, an electronic device 900 (for example: an electronic device 100 or 300) may include at least one mmWave antenna module 931, 932, or 933 between a front surface plate 910 (for example: a front surface plate 102 or 320) and a rear surface plate 920 (for example: a rear plate 111 or 380). FIG. 9 shows a state where a first mmWave antenna module 931 is disposed at the upper end of an electronic device, a second mmWave antenna module 932 is disposed at the left, and a third mmWave antenna module 933 is disposed at the right, but the placing is not limited thereto. According to various embodiments of the disclosure, at least one among the above-described mmWave antenna modules 931, 932, and 933 may be omitted, and at least another mmWave antenna module may be further disposed.

An mmWave antenna module 931, 932, or 933 may be substantially horizontally disposed (for example: a radiation surface is horizontally disposed) or perpendicularly disposed (for example: the radiation surface is perpendicularly disposed) with respect to a rear surface plate 920. For example, a first mmWave antenna module 931 may be disposed substantially horizontally with respect to a rear surface plate 920, and a second mmWave antenna module 932 and a third mmWave antenna module 933 may be disposed to be substantially perpendicular to the rear surface plate 920.

An electronic device 900 may include an antenna 950, 951, or 952 (for example: an antenna 370) disposed in a wide region inside a rear surface plate 920. An antenna 950, 951, or 952 may be disposed adjacent to an mmWave antenna module 931, 932, or 933 at least partially. According to an embodiment of the disclosure, an antenna 950, 951, or 952 may include an antenna formed in a coil shape. For example, an antenna 950 may include at least one among an MST antenna (for example: an MST antenna 420 or 620), a wireless charging antenna (for example: a wireless charging antenna 430 or 630), or an NFC antenna (for example: an NFC antenna 441, 442, or 640).

According to an embodiment of the disclosure, in case that an antenna 950 includes an MST antenna, a wireless charging antenna, and an NFC antenna, the MST antenna and the wireless charging antenna may form a first layer 952 which is substantially identical, and the NFC antenna may form a second layer 951 which is a layer under the MST antenna and the wireless charging antenna.

An electronic device 900 may include a grip sensing pad 970, 971, 972, or 973 for detecting a grip. According to an embodiment of the disclosure, a grip sensing pad 970, 971, 972, or 973 may include a coil-shaped conductor. A grip sensing pad 970, 971, 972, or 973 may be disposed adjacent to an mmWave antenna module 931, 932, or 933 so as to more accurately determine the position of a grip. For example, a first grip sensing pad 971 may be disposed adjacent to a first mmWave antenna module 931 disposed at the upper end of an electronic device 900, a second grip sensing pad 972 may be disposed adjacent to a second mmWave antenna module 932 disposed at the left of the electronic device 900, and a third grip sensing pad 973 may be disposed adjacent to a third mmWave antenna module 933 disposed at the right of the electronic device 900.

A grip sensing pad 970, 971, 972, or 973 may be laminated while being spaced a predetermined distance apart from an antenna 950, 951, or 952. In addition, a grip sensing pad 970, 971, 972, or 973 may be disposed substantially in parallel with at least a part of an antenna 950, 951, or 952. Accordingly, capacitance may be produced between a grip sensing pad 970, 971, 972, or 973 and at least a part of an antenna 950, 951, or 952, which are disposed in parallel with each other.

An electronic device 900 may acquire a capacitance value produced between a grip sensing pad 970, 971, 972, or 973 and an antenna 950, 951, or 952 and detect a grip, based on the acquired capacitance value. For example, an electronic device 900 may acquire a first capacitance value produced between an antenna 950, 951, or 952 and a first grip sensing pad 971 disposed at the upper end of the electronic device 900 and detect, based on the acquired first capacitance value, a grip at an upper end region of the electronic device 900 where the first grip sensing pad 971 is disposed, may acquire a second capacitance value produced between an antenna 950, 951, or 952 and a second grip sensing pad 972 disposed at the left of the electronic device 900 and detect, based on the acquired second capacitance value, a grip at a left region of the electronic device 900 where the second grip sensing pad 972 is disposed, and may acquire a third capacitance value produced between an antenna 950, 951, or 952 and a third grip sensing pad 973 disposed at the right of the electronic device 900 and detect, based on the acquired third capacitance value, a grip in a left region of the electronic device 900 where the third grip sensing pad 973 is disposed.

An electronic device 900 may reduce the output intensity of a communication signal through an mmWave antenna module 931, 932, or 933 disposed in a region where a grip is detected or an adjacent region. For example, an electronic device 900 may reduce: the output intensity of an RF path connected to a first mmWave antenna module 931 disposed in an upper end region of the electronic device 900 when a grip is detected in the upper end region of the electronic device 900, the output intensity of an RF path connected to a second mmWave antenna module 932 disposed in a left lower end region 482 of the electronic device 900 when a grip is detected in the left region of the electronic device 900, and the output intensity of an RF path connected to a third mmWave antenna module 933 disposed in a right region of the electronic device 900 when a grip is detected in the right region of the electronic device 900.

According to an embodiment of the disclosure, an electromagnetic wave absorption member 991 (for example: electromagnetic wave absorption member 820) may be disposed between a grip sensing pad 970, 971, 972, or 973 and an antenna 950, 951, or 952. An electromagnetic wave absorption member 991 may be scattered in a metal powder type onto a surface where a grip sensing pad 970, 971, 972, or 973 is in contact with an antenna 950, 951, or 952, so as to form a layer. For example, since an electromagnetic wave absorption member 991 is scattered in a powder type and the area of a metal material may be disregarded, a capacitance value between a grip sensing pad 970, 971, 972, or 973 and an antenna 950, 951, or 952 may not be affected. Accordingly, it may be possible to detect a grip through an electromagnetic wave absorption member 991 without degradation of an antenna 950, 951, or 952.

According to an embodiment of the disclosure, a heat dissipation member 992 may be further disposed between a grip sensing pad 970, 971, 972, or 973 and an antenna 950, 951, or 952. According to an embodiment of the disclosure, a heat dissipation member 992 may include a graphite material. According to an embodiment of the disclosure, an electromagnetic wave absorption member 991 may be scattered in a power type onto a heat dissipation member 992.

According to an embodiment of the disclosure, a rear surface plate 920 may have at least one side portion which seamlessly extends after being bent in a front surface plate 910 direction. For example, at least one side portion of a rear surface plate 920 may include a curved surface region 901 (for example: a second region 110E). In this case, a grip sensing pad 970, 971, 972, or 973 and an antenna 950, 951, or 952 may be made to extend to a curved surface region 901 to increase sensitivity of grip detection in the side surface direction of an electronic device 900. Here, the antenna 950, 951, or 952 may be formed on a flexible printed circuit board.

Figure 11:
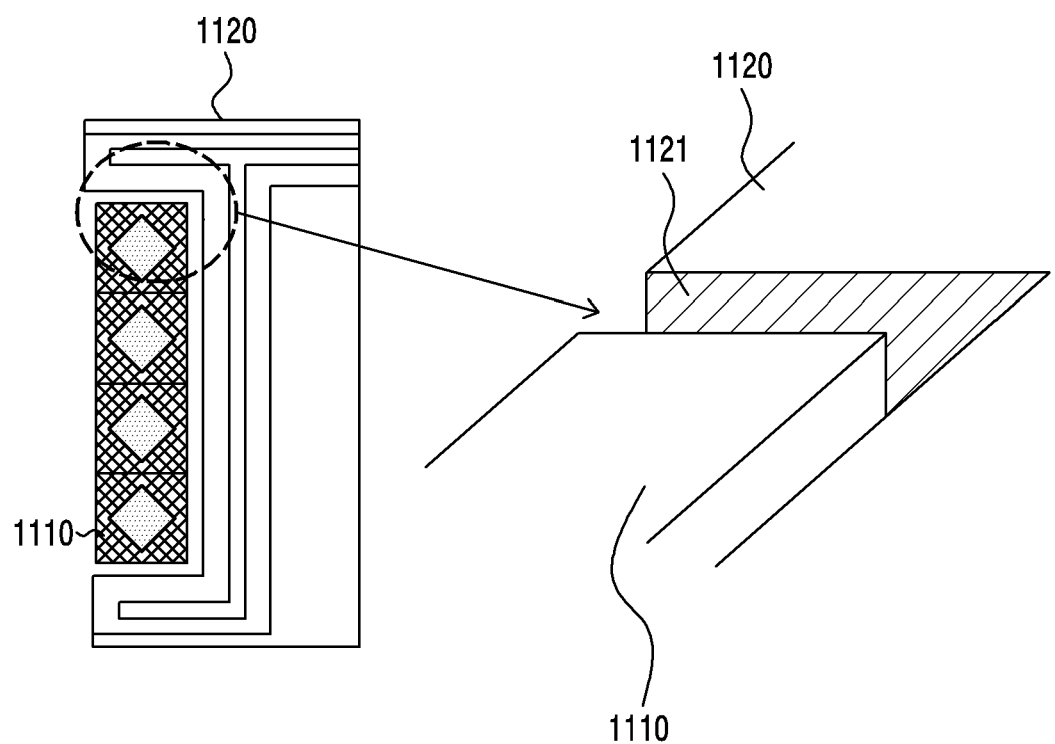
FIG. 11 is a view for explaining a grip detection method using an mmWave antenna module, according to an embodiment of the disclosure.

FIG. 11 is a view for explaining a grip detection method using an mmWave antenna module, according to an embodiment of the disclosure.

Referring to FIG. 11, an electronic device (for example: an electronic device 100, 300, or 900) may detect a grip by using an mmWave antenna module 1110. For example, an mmWave antenna module 1110 may be formed in a laminated structure on a printed circuit board, and when a conductor 1120 for detecting a grip is disposed adjacent to a conductor (for example: a copper layer) at the outskirts of the printed circuit board, an electronic device may detect a grip by using a capacitance value produced between the two conductors. According to an embodiment of the disclosure, a conductor formed at the outskirts of a printed circuit board may provide a grounding function. Otherwise, the conductor may be formed as an electromagnetic interference (EMI) conductive layer which shields the side surface of the printed circuit board.

According to an embodiment of the disclosure, a conductor 1120 for detecting a grip may include an antenna (for example: an antenna 370) disposed to occupy a wide region inside the rear surface of an electronic device. An antenna may include, for example, an MST antenna, a wireless charging antenna, or an NFC antenna. According to another embodiment of the disclosure, a conductor 1120 for detecting a grip may include a separate grip sensing pad (for example: a grip sensing pad 691, 692, 693, 694, 830, 970, 971, 972, or 973).

According to an embodiment of the disclosure, a printed circuit board on which an mmWave antenna module 1110 is formed may be mounted to be substantially perpendicular to the rear surface of an electronic device. For example, the front surface of a printed circuit board may be disposed to be substantially perpendicular to the rear surface of an electronic device. In this case, capacitance may be produced between a conductor disposed on the side surface of a printed circuit board and a conductor 1120 disposed substantially in parallel with the rear surface of an electronic device, and the electronic device may detect a grip, based on a change amount of the capacitance.

According to an embodiment of the disclosure, a conductor 1120 disposed adjacent to a printed circuit board on which an mmWave antenna module 1110 is formed has a portion 1121 (hereinafter, referred to as a bending portion) adjacent to the side surface of the printed circuit board, and the portion 1121 may be bent to be substantially parallel with the side surface of the printed circuit board. As a bending portion 1121 of a conductor 1120 adjacent to the side surface of a printed circuit board is bent in the rear surface direction of an electronic device, a portion of the conductor 1120 may extend, the portion being parallel with the side surface of the printed circuit board. Accordingly, as a bending portion 1121 of a conductor 1120 and a conductor disposed on the side surface of a printed circuit board overlap each other over a wider region, sensitivity of grip detection in the side surface direction of an electronic device may increase.

According to an embodiment of the disclosure, at least a part of the side surface of an mmWave antenna module 1110 may be plated, and a grip may be detected based on a capacitance value between a plating portion and a bending portion.

Figure 12:
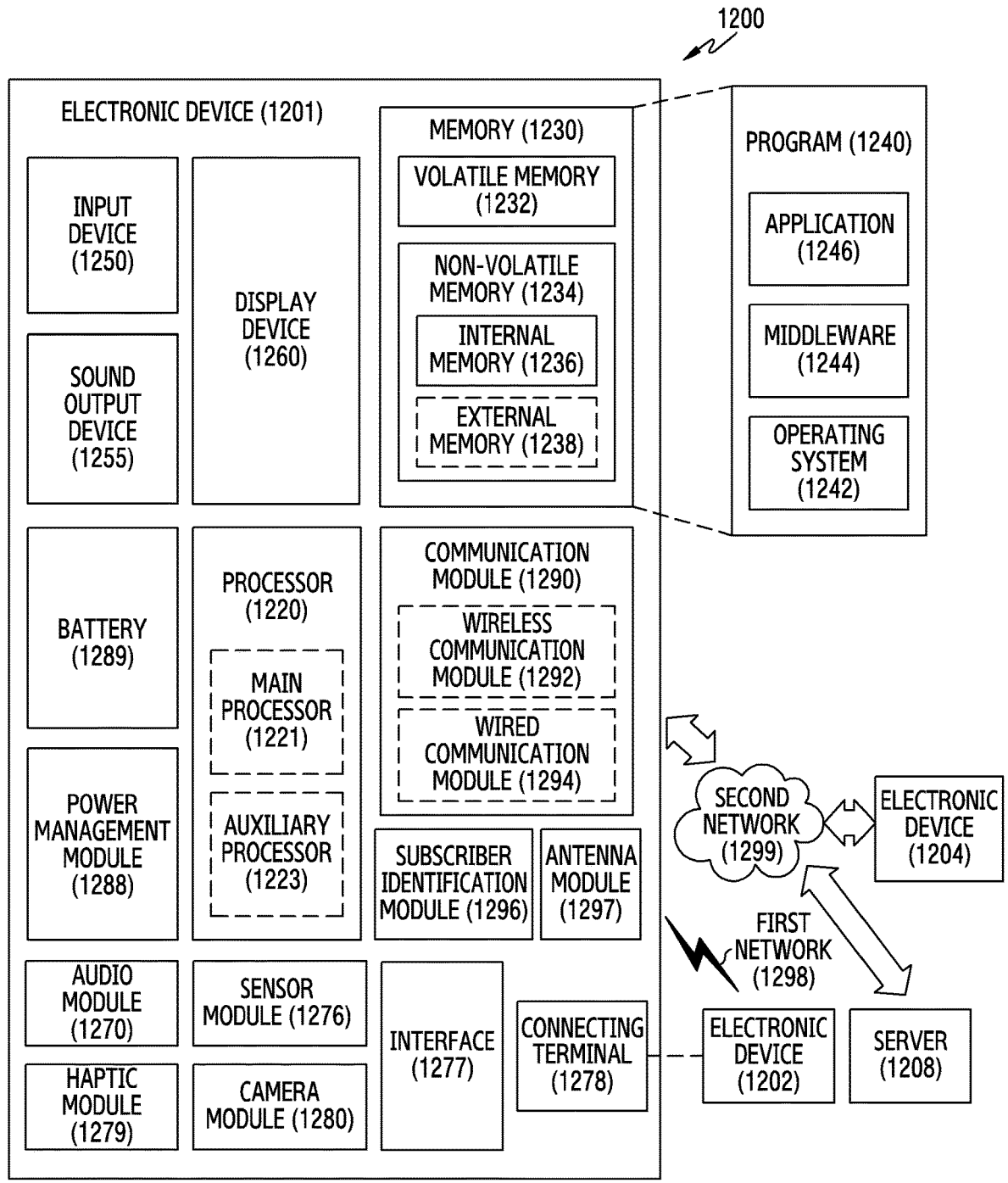
FIG. 12 is a block diagram of an electronic device in a network environment, according to an embodiment of the disclosure.

FIG. 12 is a block diagram illustrating an example electronic device 1201 in a network environment 1200 according to an embodiment of the disclosure.

Referring to FIG. 12, the electronic device 1201 in the network environment 1200 may communicate with an electronic device 1202 via a first network 1298 (e.g., a short-range wireless communication network), or an electronic device 1204 or a server 1208 via a second network 1299 (e.g., a long-range wireless communication network). According to an embodiment of the disclosure, the electronic device 1201 may communicate with the electronic device 1204 via the server 1208. According to an embodiment of the disclosure, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290, a subscriber identification module (SIM) 1296, or an antenna module 1297. In some embodiments of the disclosure, at least one (e.g., the connecting terminal 1278) of the components may be omitted from the electronic device 1201, or one or more other components may be added in the electronic device 1201. In some embodiments of the disclosure, some (e.g., the sensor module 1276, the camera module 1280, or the antenna module 1297) of the components may be implemented as single integrated circuitry.

The processor 1220 may execute, for example, software (e.g., a program 1240) to control at least one other component (e.g., a hardware or software component) of the electronic device 1201 coupled with the processor 1220, and may perform various data processing or computation. According to an embodiment of the disclosure, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment of the disclosure, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, if the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment of the disclosure, the auxiliary processor 1223 (e.g., an image signal processor or a communication processor) may be implemented as part of another component (e.g., the camera module 1280 or the communication module 1290) functionally related to the auxiliary processor 1223. According to an embodiment of the disclosure, the auxiliary processor 1223 (e.g., a neural network processing device) may include a hardware structure specialized for processing an artificial intelligence model. The artificial intelligence model may be created through machine learning. Such learning may be performed, for example, in the electronic device 1201 on which artificial intelligence is performed, or may be performed through a separate server (e.g., the server 1208). A learning algorithm may include, for example, supervised learning, unsupervised learning, semi-supervised learning, or reinforcement learning, but is not limited to the aforementioned example. The artificial intelligence model may include a plurality of artificial neural network layers. The artificial neural network may be one of a Deep Neural Network (DNN), a Convolutional Neural Networks (CNN), a Recurrent Neural Network (RNN), a Restricted Boltzmann Machine (RBM), a Deep Belief Network (DBN), a Bidirectional Recurrent Deep Neural Network (BRDNN), a deep Q-network, or a combination of at least two of those elements, but is not limited to the aforementioned example. In addition to the hardware structure, additionally or alternatively, the artificial intelligence model may include a software structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for an incoming call. According to an embodiment of the disclosure, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment of the disclosure, the display module 1260 may include touch sensor adapted to detect a touch, or a pressure sensor adapted to measure the intensity of force incurred by the touch.

The audio module 1270 may convert a sound into an electrical signal and vice versa. According to an embodiment of the disclosure, the audio module 1270 may obtain the sound via the input module 1250, or output the sound via the sound output module 1255, or an external electronic device (e.g., an electronic device 1202)(e.g., a speaker or a headphone) directly or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment of the disclosure, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment of the disclosure, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment of the disclosure, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1279 may include, for example, a motor, a piezoelectric element, or an electric stimulator.

The camera module 1280 may capture a still image or moving images. According to an embodiment of the disclosure, the camera module 1280 may include one or more lenses, image sensors, image signal processors, or flashes.

The power management module 1288 may manage power supplied to the electronic device 1201. According to an embodiment of the disclosure, the power management module 1288 may be implemented as at least part of, for example, a power management integrated circuit (PMIC).

The battery 1289 may supply power to at least one component of the electronic device 1201. According to an embodiment of the disclosure, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment of the disclosure, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device 1204 via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify or authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network evolved from a 4G network and a next-generation communication technology, for example, a New Radio (NR) access technology. The NR access technology may support enhanced Mobile Broadband (eMBB), massive Machine Type Communications (mMTC), or Ultra-Reliable and Low-Latency Communications (URLLC). The wireless communication module 192 may support, for example, a high frequency band (e.g., an mmWave band) to achieve a high data rate. The wireless communication module 1292 may support various technologies for securing performance in a high frequency band, for example, beamforming, massive array Multiple-Input and Multiple-Output (MIMO), and Full-Dimensional MIMO (FD-MIMO), an array antenna, analog beam-forming, or a large scale antenna. The wireless communication module 1292 may support various requirements defined in the electronic device 1201, an external electronic device (e.g., the electronic device 1204), or a network system (e.g., the second network 1299). According to an embodiment of the disclosure, the wireless communication module 1292 may support a peak data rate (e.g., 20 Gbps or more) for realizing eMBB, a loss coverage (e.g., 164 dB or less) for realizing mMTC, or U-plane latency (e.g., 0.5 ms or less or a round trip of 1 ms or less for each of downlink (DL) and uplink (UL)) for realizing URLCC.

The antenna module 1297 may transmit or receive a signal or power to or from the outside (e.g., the external electronic device) of the electronic device 1201. According to an embodiment of the disclosure, the antenna module 1297 may include an antenna including a radiating element including a conductive material or a conductive pattern formed in or on a substrate (e.g., PCB). According to an embodiment of the disclosure, the antenna module 1297 may include a plurality of antennas (e.g., array antenna). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment of the disclosure, another component (e.g., a radio frequency integrated circuit (RFIC)) other than the radiating element may be additionally formed as part of the antenna module 1297.

According to various embodiments of the disclosure, the antenna module 1297 may construct an mmWave antenna module. According to an embodiment of the disclosure, the mmWave antenna module may include a printed circuit board, an RFIC disposed on or adjacent to a first face (e.g., a bottom face) of the printed circuit board and capable of supporting a designated high frequency band (e.g., an mmWave band), and a plurality of antennas (e.g., an array antenna) disposed on or adjacent to a second face (e.g., a top face or a side face) of the printed circuit board and capable of transmitting or receiving a signal in the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1201 and the external electronic device 1204 via the server 1208 coupled with the second network 1299. Each of the electronic devices 1202 or 1204 may be a device of a same type as, or a different type, from the electronic device 1201. According to an embodiment of the disclosure, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To this end, for example, technologies of cloud computing, distributed computing, Mobile Edge Computing (MEC), or client-server computing may be used. The electronic device 1201 may provide an ultra-low latency service using, for example, distributed computing or mobile edge computing. In another embodiment of the disclosure, the external electronic device 1204 may include an Internet of Things (IoT) device. The server 1208 may be an intelligent server using machine learning and/or neural networks. According to an embodiment of the disclosure, the external electronic device 1204 or the server 1208 may be included in the second network 1299. The electronic device 1201 may be applied to an intelligent service (e.g., a smart home, a smart city, a smart car, or health care) based on a 5G communication technique and an IoT related technique.

Figure 13A:
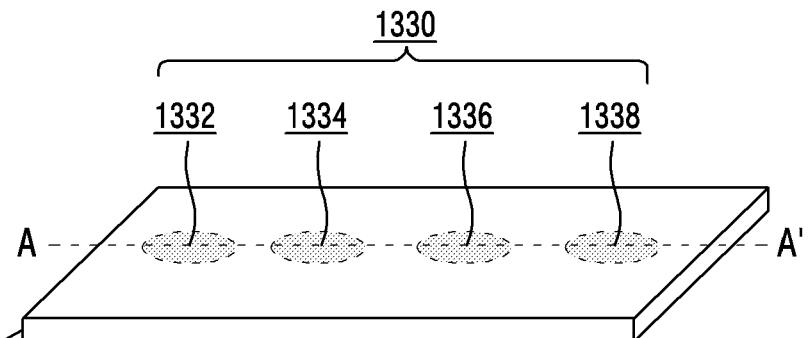
FIG. 13A shows the structure of an mmWave antenna module according to an embodiment of the disclosure.
Figure 13B:
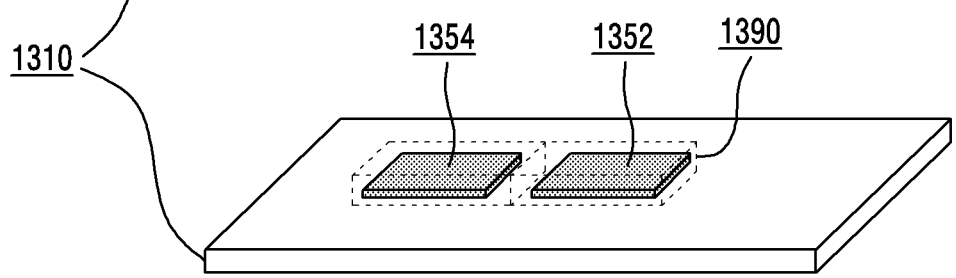
FIG. 13B shows the structure of an mmWave antenna module according to an embodiment of the disclosure.
Figure 13C:
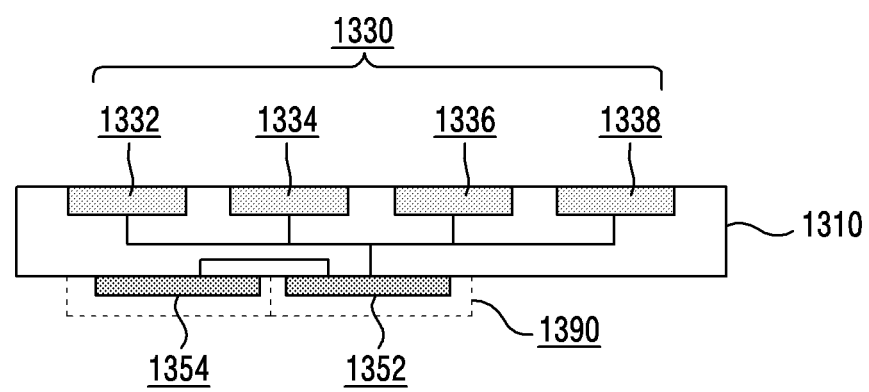
FIG. 13C shows the structure of an mmWave antenna module according to an embodiment of the disclosure.

FIG. 13A shows the structure of an mmWave antenna module according to an embodiment of the disclosure, FIG. 13B shows the structure of an mmWave antenna module according to an embodiment of the disclosure, and FIG. 13C shows the structure of an mmWave antenna module according to an embodiment of the disclosure. An mmWave antenna module illustrated in FIG. 13A, 13B, or 13C may be the same as or similar to an mmWave antenna module 411, 412, 413, or 414 illustrated in FIG. 4 or 5, an mmWave antenna module 611, 612, 613, or 614 illustrated in FIG. 6 or 7, an mmWave antenna module 931, 932, or 933 illustrated in FIG. 9, or an mmWave antenna module 1110 illustrated in FIG. 11.

FIG. 13A is a perspective view of an mmWave antenna module viewed from one side thereof, FIG. 13B is a perspective view of the mmWave antenna module viewed from the other side thereof, and FIG. 13C is a sectional view of A-A' of the mmWave antenna module.

Referring to FIG. 13A, FIG. 13B, and FIG. 13C, in an embodiment of the disclosure, an mmWave antenna module may include a printed circuit board 1310, an antenna array 1330, a radio frequency integrated circuit (RFIC) 1352, and a power management integrated circuit (PMIC) 1354. Selectively, the mmWave antenna module may further include a shielding member 1390. In other embodiments of the disclosure, at least one among the above-described components may be omitted, or at least two among the components may be integrally formed.

A printed circuit board 1310 may include a plurality of conductive layers and a plurality of non-conductive layers alternately laminated with the conductive layers. By using wires and conductive vias formed at conductive layers, a printed circuit board 1310 may provide electrical connection between various electronic components disposed on and/or outside the printed circuit board 1310.

An antenna array 1330 may include a plurality of antenna elements 1332, 1334, 1336, or 1338 disposed to produce a directional beam. Antenna elements 1332, 1334, 1336, or 1338 may be formed on a first surface of a printed circuit board 1310, as illustrated. According to another embodiment of the disclosure, an antenna array 1330 may be formed inside a printed circuit board 1310. According to an embodiment of the disclosure, an antenna array 1330 may include a plurality of antenna arrays (for example: dipole antenna arrays and/or patch antenna arrays) of the same or different shapes or types.

An RFIC 1352 may be disposed in a separate region (for example: a second surface opposite to a first surface) of a printed circuit board 1310 spaced apart from an antenna array 1330. An RFIC 1352 may be configured to process a signal of a selected frequency band, the signal being transmitted or received through an antenna array 1330. According to an embodiment of the disclosure, at the time of transmission, an RFIC 1352 may convert a baseband signal acquired from a communication processor (not shown) into an RF signal of a designated band. At the time of reception, an RFIC 1352 may convert an RF signal received through an antenna array 1352 into a baseband signal and transmit the converted signal to a communication processor.

According to another embodiment of the disclosure, at the time of transmission, an RFIC 1352 may up-convert an IF signal (for example: approximately 9 GHz to approximately 11 GHz) acquired from an intermediate frequency integrated circuit (IFIC) into an RF signal of a selected band. At the time of reception, an RFIC 1352 may down-convert an RF signal acquired through an antenna array 1352, convert the down-converted signal into an IF signal, and transmit the converted signal to an IFIC.

A PMIC 1354 may be disposed in another partial region (for example: a second surface) of a printed circuit board 1310 spaced apart from an antenna array 1330. A PMIC 1354 may receive a voltage supplied from a main PCB (not shown) to provide a power source required for various components (for example: an RFIC 1352) on an mmWave antenna module.

A shielding member 1390 may be disposed on a part (for example: a second surface) of a printed circuit board 1310 to electromagnetically shield at least one among an RFIC 1352 or a PMIC 1354. According to an embodiment of the disclosure, a shielding member 1390 may include a shield can.

Although not illustrated, in various embodiments of the disclosure, an mmWave antenna module may be electrically connected to a separate printed circuit board (for example: a main circuit board) through a module interface. A module interface may include a connection member, for example, a coaxial cable connector, a board to board connector, an interposer, or a flexible printed circuit board (FPCB). Through a connection member, an RFIC 1352 and/or a PMIC 1354 of an mmWave antenna module may be electrically connected to a printed circuit board.

As described above, according to various embodiments of the disclosure, an electronic device may include: a housing including a front surface, a rear surface, and a side surface which at least partially surrounds a space between the front surface and the rear surface, a first antenna disposed in the space, a second antenna disposed substantially in parallel with the rear surface in the space and formed in a coil shape, a conductor spaced a predetermined distance apart from a partial region of the second antenna substantially in parallel therewith and at least partially overlapping the partial region when viewed from one direction of the electronic device, a sensor electrically connected to the conductor, a communication circuit electrically connected to the first antenna, and a processor electrically connected to the sensor and the communication circuit, wherein at least one of the second antenna and the conductor is disposed adjacent to the first antenna, and the processor is configured to acquire, through the sensor, a capacitance value related to the conductor, and reduce an intensity of a signal outputted through the first antenna according to the acquired capacitance value.

According to various embodiments of the disclosure, the electronic device may further include an electromagnetic wave absorption member disposed between the second antenna and the conductor.

According to various embodiments of the disclosure, the electromagnetic wave absorption member may be scattered in a metal powder type onto a surface where the conductor is in contact with the second antenna, so as to form a layer.

According to various embodiments of the disclosure, the electronic device may further include a heat dissipation member disposed between the second antenna and the conductor.

According to various embodiments of the disclosure, the electromagnetic wave absorption member may be scattered in a metal powder type onto the heat dissipation member, so as to form a layer.

According to various embodiments of the disclosure, the first antenna may transmit or receive a signal of millimeter wave band.

According to various embodiments of the disclosure, the second antenna may transmit or receive a signal and/or power for at least one of near field communication (NFC), wireless charging, and magnetic secure transmission (MST).

According to various embodiments of the disclosure, at least a part of an edge of the rear surface may be formed as a curved surface bent in a direction to the front surface, and the overlapping region may extend to a region where the curved surface is formed.

As described above, according to various embodiments of the disclosure, an electronic device may include a housing including a front surface, a rear surface, and a side surface which at least partially surrounds a space between the front surface and the rear surface, an antenna disposed in the space and formed on a printed circuit board which includes a first conductor, a second conductor spaced a predetermined distance apart from the first conductor and at least partially overlapping the first conductor when viewed from one direction of the electronic device, a sensor electrically connected to the second conductor, a communication circuit electrically connected to the antenna, and a processor electrically connected to the sensor and the communication circuit, wherein the processor is configured to acquire, through the sensor, a capacitance value produced between the first conductor and the second conductor, and reduce an intensity of a signal outputted through the antenna according to the acquired capacitance value.

According to various embodiments of the disclosure, the first conductor may provide a grounding function.

According to various embodiments of the disclosure, the first conductor may have an electromagnetic interference (EMI) conductive layer which shields the side surface of the printed circuit board.

According to various embodiments of the disclosure, the printed circuit board may be disposed to be substantially perpendicular to the rear surface.

According to various embodiments of the disclosure, the second conductor may have a part adjacent to the first conductor, the part being bent to be substantially parallel with the first conductor.

As described above, according to various embodiments of the disclosure, an electronic device may include a housing including a front surface, a rear surface, and a side surface which at least partially surrounds a space between the front surface and the rear surface, a first antenna disposed in the space, a second antenna disposed substantially in parallel with the rear surface in the space and formed in a coil shape, a third antenna disposed substantially in parallel with the rear surface in the space, formed in a coil shape, spaced a predetermined distance apart from a partial region of the second antenna substantially in parallel therewith, and at least partially overlapping the partial region when viewed from one direction of the electronic device, a sensor electrically connected to the second antenna and the third antenna, a first communication circuit electrically connected to the first antenna, and a processor electrically connected to the sensor and the first communication circuit, wherein at least one of the second antenna and the third antenna is disposed adjacent to the first antenna, and the processor is configured to acquire, through the sensor, a capacitance value produced between the second antenna and the third antenna, and reduce an intensity of a signal outputted through the first antenna according to the acquired capacitance value.

According to various embodiments of the disclosure, the first antenna may transmit or receive a signal of millimeter wave band.

According to various embodiments of the disclosure, the second antenna may include a near field communication (NFC) antenna, and the third antenna may include at least one of a wireless charging antenna and a magnetic secure transmission (MST) antenna.

According to various embodiments of the disclosure, the second antenna may include a first NFC antenna disposed at the left of a central portion of the electronic device and a second NFC antenna disposed at the right of the central portion of the electronic device, and the first NFC antenna and the second NFC antenna may be connected through a switch included in a second communication circuit.

According to various embodiments of the disclosure, the switch may be short-circuited and connect the first NFC antenna and the second NFC antenna at the time of transmitting or receiving a signal through the second antenna, and may be opened and separate the first NFC antenna and the second NFC antenna at the time of acquiring, through the sensor, a capacitance value produced between the second antenna and the third antenna.

According to various embodiments of the disclosure, the third antenna may include an MST antenna disposed at the upper end of a central portion of the electronic device and a wireless charging antenna disposed at the central portion of the electronic device, and the MST antenna and the wireless charging antenna may be connected through a switch included in a circuit in which a second communication circuit and a charging circuit are integrated.

According to various embodiments of the disclosure, the switch may be opened and separate the wireless charging antenna and the MST antenna at the time of wireless charging using the wireless charging antenna or acquiring, through the sensor, a capacitance value produced between the second antenna and the third antenna, and may be short-circuited and connect the wireless charging antenna and the MST antenna at the time of transmitting or receiving a signal through the second antenna or the MST antenna.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that the various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, firmware or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1240) including one or more instructions that are stored in a storage medium (e.g., internal memory 1236, or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separated and disposed to other component. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a front surface, a rear surface, and a side surface which at least partially surrounds a space between the front surface and the rear surface;
a first antenna disposed in the space;
a second antenna disposed substantially in parallel with the rear surface in the space and formed in a coil shape;
a conductor spaced a predetermined distance apart from a partial region of the second antenna substantially in parallel therewith and at least partially overlapping the partial region, wherein the partial region is where the antennas overlap each other when viewed from above the front surface;
a sensor electrically connected to the conductor;
a communication circuit electrically connected to the first antenna; and
a processor electrically connected to the sensor and the communication circuit, wherein at least one of the second antenna or the conductor is disposed adjacent to the first antenna, and
wherein the processor is configured to:
acquire, through the sensor, a capacitance value related to the conductor, and reduce an intensity of a signal outputted through the first antenna according to the acquired capacitance value.

2. The electronic device of claim 1, further comprising an electromagnetic wave absorption member disposed between the second antenna and the conductor.

3. The electronic device of claim 2, wherein the electromagnetic wave absorption member is scattered in a metal powder type onto a surface where the conductor is in contact with the second antenna, so as to form a layer.

4. The electronic device of claim 2, further comprising a heat dissipation member disposed between the second antenna and the conductor.

5. The electronic device of claim 4, wherein the electromagnetic wave absorption member is scattered in a metal powder type onto the heat dissipation member, so as to form a layer.

6. The electronic device of claim 1, wherein the first antenna transmits or receives a signal of millimeter wave band.

7. The electronic device of claim 1, wherein the second antenna transmits or receives a signal and/or power for at least one of near field communication (NFC), wireless charging, or magnetic secure transmission (MST).

8. The electronic device of claim 1,
wherein at least a part of an edge of the rear surface is formed as a curved surface bent in a direction to the front surface, and
wherein the antennas and conductor extend to a region where the curved surface is formed.

* * * * *